(12) United States Patent
Morlion et al.

(10) Patent No.: US 7,346,242 B2
(45) Date of Patent: Mar. 18, 2008

(54) OPTICAL CONNECTOR ASSEMBLY, COUPLING DEVICE AND METHOD FOR ALIGNING SUCH A COUPLING DEVICE AND A WAVEGUIDE STRUCTURE

(75) Inventors: Danny Louis Cornelius Morlion, Ghent (BE); Jan Peter Karel Van Koetsem, Bazel (BE)

(73) Assignee: FCI, Versailles (FR)

( * ) Notice: Subject to any disclaimer, the term of this patent is extended or adjusted under 35 U.S.C. 154(b) by 243 days.

(21) Appl. No.: 10/523,437
(22) PCT Filed: Jul. 22, 2003
(86) PCT No.: PCT/EP03/50330

§ 371 (c)(1),
(2), (4) Date: Aug. 10, 2005

(87) PCT Pub. No.: WO2004/015474

PCT Pub. Date: Feb. 19, 2004

(65) Prior Publication Data

US 2006/0120673 A1 Jun. 8, 2006

(30) Foreign Application Priority Data

Aug. 2, 2002 (NL) .................................... 1021205

(51) Int. Cl.
*G02B 6/26* (2006.01)
(52) U.S. Cl. .................... 385/52; 385/49; 385/31; 385/33; 385/14; 385/131; 385/88; 385/89; 385/92; 385/93; 385/76; 385/77; 385/90; 385/91
(58) Field of Classification Search ............... 385/52, 385/53, 49, 31, 32, 33, 76, 77, 78, 88, 89, 385/92, 3, 95, 139, 14, 129, 130, 131, 132, 385/93, 90, 91
See application file for complete search history.

(56) References Cited

U.S. PATENT DOCUMENTS 5,345,524 A 9/1994 Lebby et al. ............... 385/88
5,913,002 A * 6/1999 Jiang ........................... 385/88
6,097,864 A 8/2000 Kropp ........................ 385/44

(Continued)

FOREIGN PATENT DOCUMENTS

| EP | 0 911 658 A1 | 4/1999 |
| JP | 61133911 | 6/1986 |
| WO | WO 96/07117 | 3/1996 |

OTHER PUBLICATIONS

Van Der Linden et al., "Micromachined Photodiode Submount with Integrated Mirror for Efficient Out-of-Plane Coupling to Planar Polymeric Waveguide Circuits", XP-000860818, Japanese Journal of Applied Physics, Publication Office Japanese Journal of Applied Physics, Tokyo, Japan, vol. 37, No. 6B, Jun. 1998, 1 pg.

(Continued)

*Primary Examiner*—Brian M. Healy
(74) *Attorney, Agent, or Firm*—Harrington & Smith, PC

(57) ABSTRACT

The invention relates to an optical connector assembly for optically connecting to a waveguide structure in a x-y plane of a layer stack, wherein the connector assembly comprises a coupling device providing a first optical path, and the waveguide structure provides a second optical path, deflecting from said first optical path. The coupling device comprises first reference means adapted to co-operate with second reference means in the layer stack, wherein the second reference means are adapted for aligning the coupling device to the waveguide structure in both the x- and y-direction of the x-y plane as to optically couple the first and second optical path. As a result an optical connector assembly is provided that improves the optical coupling between the optical path in a waveguide structure and in a coupling device and/or a mating optical device. The coupling device may comprise third reference means to couple an optical connector to the waveguide structure. The invention also relates to a method for aligning the coupling device and the waveguide structure.

34 Claims, 21 Drawing Sheets

U.S. PATENT DOCUMENTS

| | | | |
|---|---|---|---|
| 6,236,788 B1 | 5/2001 | Moisel | 385/52 |
| 6,976,793 B2* | 12/2005 | Tourne | 385/88 |
| 7,178,994 B2* | 2/2007 | Tourne | 385/89 |
| 2002/0164129 A1* | 11/2002 | Jackson | 385/52 |
| 2002/0176671 A1* | 11/2002 | Tourne | 385/88 |
| 2002/0196997 A1* | 12/2002 | Chakravorty et al. | 385/14 |
| 2006/0120673 A1* | 6/2006 | Morlion et al. | 385/89 |

OTHER PUBLICATIONS

Yoshimura et al., "Low-Loss Polymeric Optical Waveguides with 45 Degree Mirrors", 1997 6th Microoptics Conference and 14th Topical Meeting on Gradient Index Optical Systems, Tokyo, Japan, Oct. 7-9, 1997, 3 pgs.

* cited by examiner

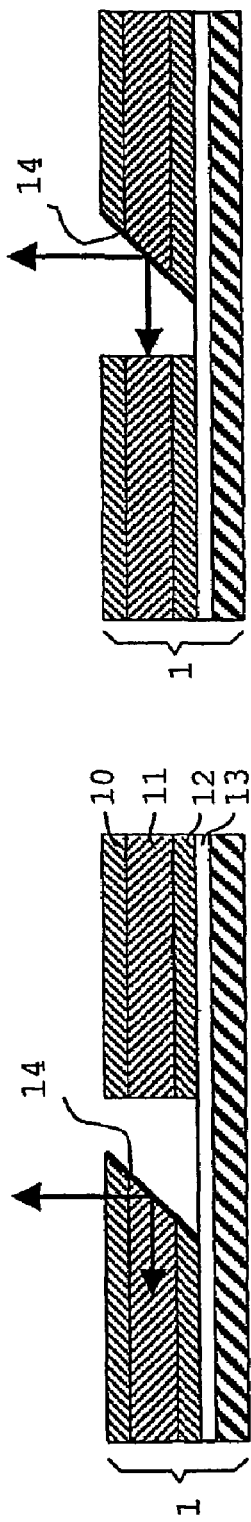
Fig. 2A
Fig. 2B
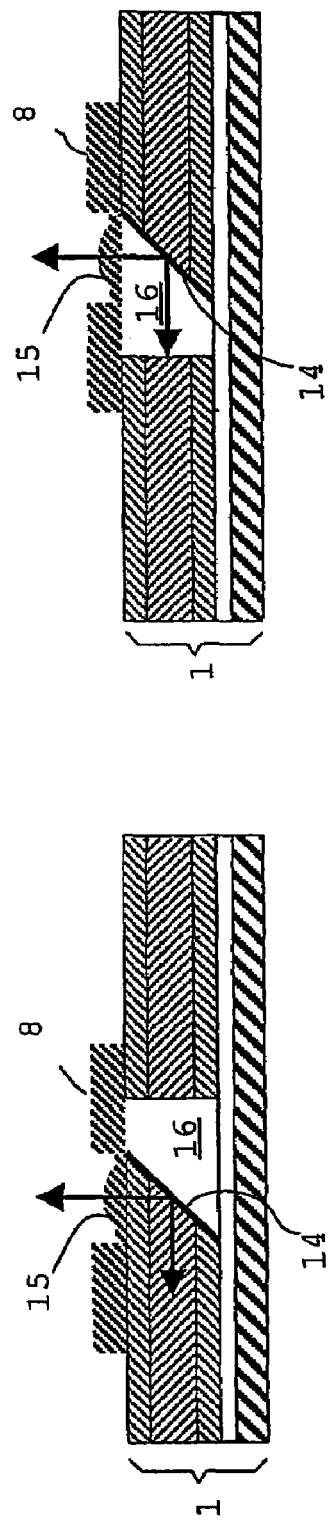
Fig. 2C
Fig. 2D
Fig. 2

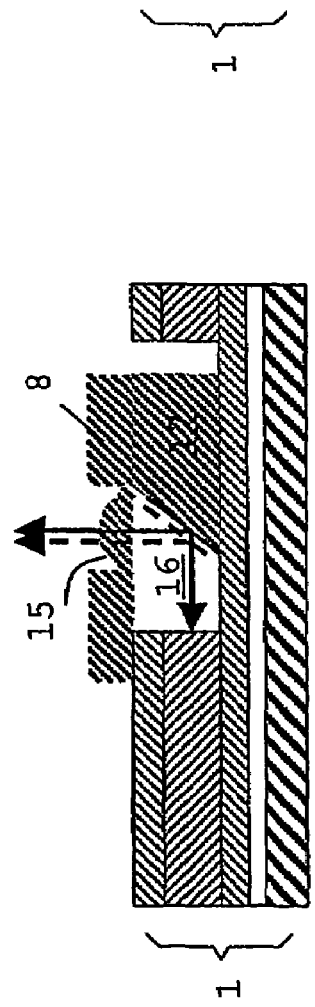
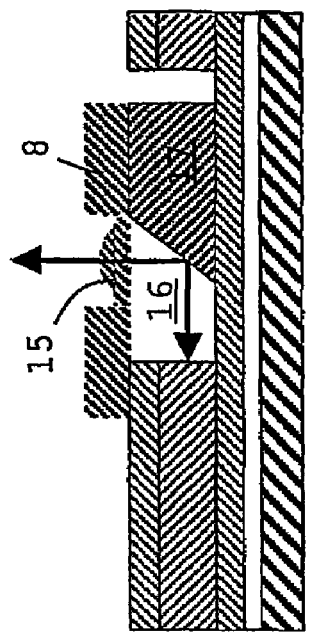
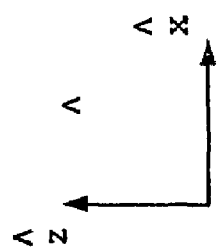
Fig. 2E
Fig. 2F
Fig. 2

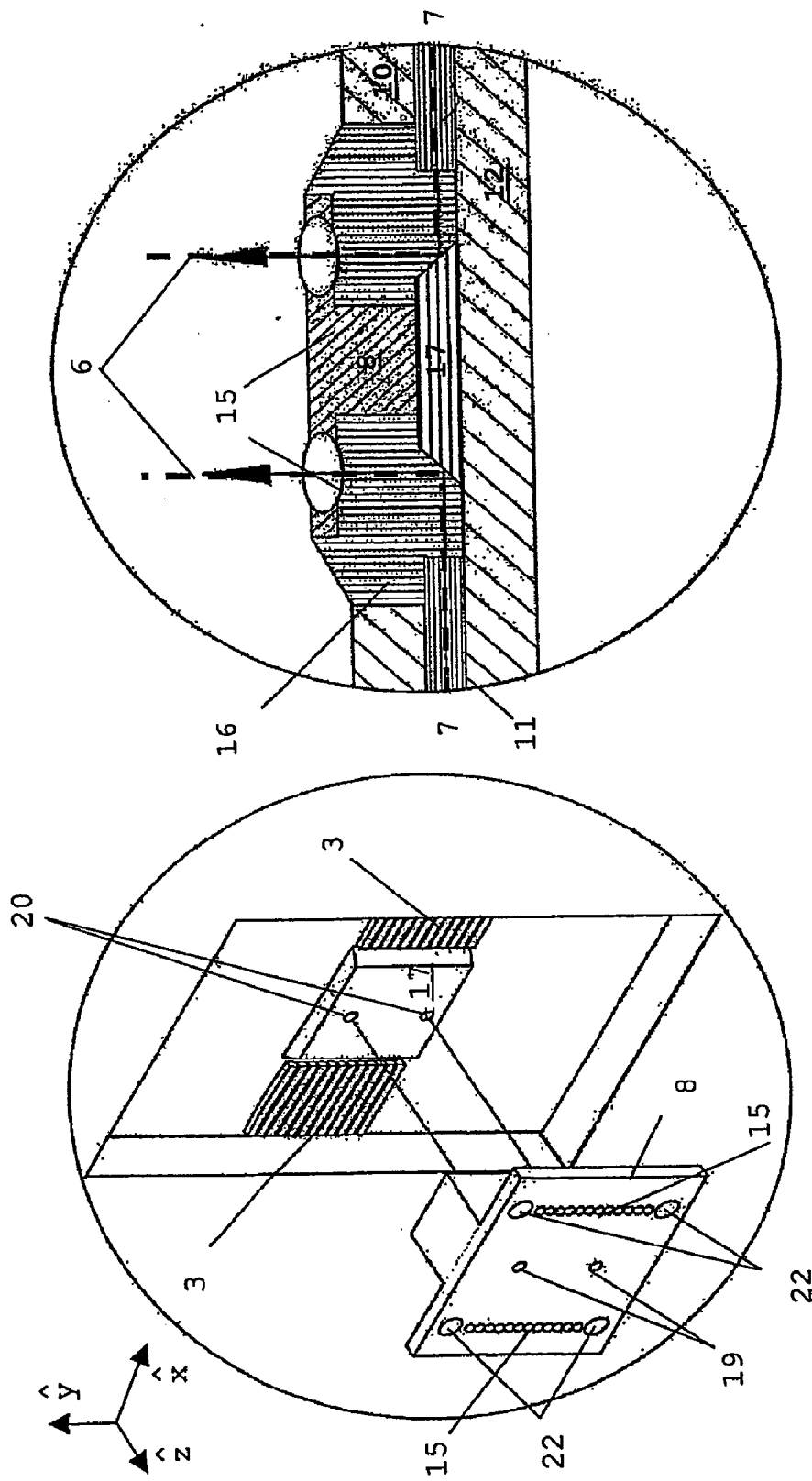

US 7,346,242 B2

OPTICAL CONNECTOR ASSEMBLY, COUPLING DEVICE AND METHOD FOR ALIGNING SUCH A COUPLING DEVICE AND A WAVEGUIDE STRUCTURE

FIELD OF THE INVENTION

The invention relates to an optical connector assembly for optically connecting to at least one waveguide structure in at least one x-y plane of a layer stack, said connector assembly comprising a coupling device providing at least one first optical path, said waveguide structure comprising at least one optical waveguide providing at least one second optical path deflecting from said first optical path, said coupling device comprising first reference means adapted to co-operate with second reference means in said layer stack. The invention further relates to a coupling device for use in such an optical connector assembly and to a method for aligning a coupling device to a waveguide structure.

BACKGROUND OF THE INVENTION

An optical backplane, which may be a printed circuit board (PCB), is used to optically couple optical, optoelectrical devices or other PCB's by providing an optical path over which optical signals can be transmitted. Usually optical waveguides are used for providing an optical path to transmit these optical signals over the backplane. In a hybrid approach, these waveguides are integrated or embedded in the backplane. Such a backplane is schematically shown in FIG. 1 and will be discussed below. In order to reduce optical loss in the coupling of this waveguide structure and the components or other PCB's, alignment is a key issue in this area.

U.S. Pat. No. 6,236,788 B1 discloses an arrangement for aligning optical components, wherein an arrangement is provided for coupling light into or out of a waveguide, that is positioned on a base plate. The base plate supports a mirror mount. A holding device for holding optical or opto-electronic components, such as a lens or glass fibre connectors, is provided as well. The mirror mount includes first alignment marks and the holding device includes second alignment marks which snap together with the first alignment marks to permit an alignment in a direction (x-direction) that is parallel to the waveguide. The holding device includes third alignment marks and the base plate includes fourth alignment marks which are used for an alignment in a direction (y-direction) that is perpendicular to the waveguide However, an alignment arrangement as disclosed in the prior art, does not provide an efficient optical coupling between the first optical path in the holding device and the second optical path defined by the waveguide structure, since the reference marks do not ensure proper alignment. The reference marks only result in an independent alignment in the x-direction or the y-direction. Simultaneous alignment in both the x- and y-direction of the x-y plane is not ensured.

SUMMARY OF THE INVENTION

It is an object of the invention to provide an optical connector assembly that improves the optical coupling between a waveguide structure and a coupling device.

This object is achieved by providing an optical connector assembly characterised in that said second reference means are adapted for aligning said coupling device to said waveguide or waveguide structure in both the x- and y-direction of said x-y plane as to optically couple said first optical path and said second optical path. In this way efficient optical coupling is achieved, since the x-direction and the y-direction are aligned simultaneously.

Preferably the coupling device further comprises third reference means for aligning a mating optical device, providing a third optical path, with a waveguide or waveguide structure as to optically couple the second optical path and the third optical path. Since the first reference means and third reference means may be manufactured in the same process step or positioned relatively to each other in a predetermined manner, the coupling device can be manufactured to be an accurate intermediate component for coupling the optical paths provided by the waveguide or waveguide structure and the mating device. The optical connector of such a mating optical device may have fourth reference means adapted to co-operate with the third reference means of the coupling device. The third and fourth reference means may be guide reference means, such as guide pins and corresponding holes or v-shaped ridges and corresponding v-shaped grooves. The coupling device comprises an area providing the first optical path. In an embodiment of the invention this area may comprise an optical component such as a lens or lens array. Lenses can be advantageously applied to optimise coupling to mating devices and/or fibres thereof and to collimate diverging light beams.

In an embodiment of the invention the first optical path is deflected under a deflection angle with respect to the second optical path. This deflection can be achieved by providing a reflective layer on a facet of a waveguide of the waveguide structure. Such a deflection has the advantage that the position of the deflective means in the z-direction is defined by the waveguide itself.

Moreover a mirror mount can be used to achieve the aforementioned deflection. Such a mirror mount preferably has referencing means for alignment with the optical component, if present. Alignment of the mirror mount with respect to the waveguide structure can be achieved by using the second reference means in positioning this mirror mount by a pick- and place machine. Moreover, the same or different referencing means on the mirror mount may be used to align this mirror mount and the optical component.

The mirror mount may constitute an integral part of the coupling device, which coupling device may comprise the optical component as well. This is advantageous because in such an integrated coupling device, there are less degrees of freedom since movement between the mirror mount and the optical component is disabled.

The deflection angle preferably is substantially ninety degrees. Such a deflection angle can be advantageously applied in a layer stack such as a printed circuit board (PCB) using the hybrid approach for the optical backplane.

In an embodiment of the invention the layer stack comprises multiple waveguides in the x-y plane or over each other in the z-direction. In such an embodiment the reflective surfaces of the waveguides or the mirror mount are adapted to deflect optical signals between the multiple second optical paths provided by these multiple waveguides and corresponding first optical paths provided by the coupling device.

In a preferred embodiment of the invention the waveguide structure is adapted as to position the mirror mount in the second optical path. Preferably the mirror mount is positioned on the cladding layer. In this way position control in the z-direction is obtained; insufficient position control in the z-direction may negatively influence alignment in the x-direction of the x-y plane. The same holds for the first reference means if these means are guide reference means such as pins. Preferably these guide reference means define a plane parallel to the x-y plane. The mirror mount can be fixed to the waveguide structure by filling a space, defined in at least in the cladding layer under the mirror mount, with an adhesive substance. This adhesive substance exerts a pulling force to the mirror mount, holding this mirror mount in accurate position. The mirror mount may be supported by support structure(s) provided in this space.

In an embodiment of the invention the first and second reference means have restricted dimensions in the x-y plane. Such second reference means facilitate simultaneous alignment in both the x- and y-direction.

In an embodiment of the invention the second reference means are provided in the same layer of the layer stack. Preferably this layer corresponds to a layer of the waveguide structure or the top layer of the stack. In the first case, the second reference means can be applied simultaneously with one of the process steps for manufacturing the waveguide structure, while in the second case the second reference means are easily accessible for alignment.

In an embodiment of the invention the first and second reference means are guide reference means or index reference means. Guide reference means are e.g. guide pins, extending in a direction perpendicular to the x-y plane (z-direction), and corresponding guide holes for fitting the guide pins for alignment. Index reference means are markings that are visible to e.g. a pick and place machine for aligning the coupling device and the waveguide structure. It is to be noted that visibility not necessarily refers to visibility by the eye, but may also refer to e.g. visibility in the x-ray spectrum.

Finally the invention relates to a method for aligning a coupling device, providing a first optical path, and a waveguide structure, comprising at least one optical waveguide, in a x-y plane of a layer stack, said waveguide providing a second optical path, deflecting from said first optical path, said coupling device comprising first reference means, said method comprising the steps of applying second reference means in at least one single layer of said layer stack in a pre-determined x-direction and y-direction relative to said waveguide structure and aligning said coupling device and said waveguide structure by matching said first reference means in the x- and y-direction of said x-y plane with said second reference means.

U.S. Pat. No. 6,404,960 discloses a flexible optical connector assembly for connecting a flexible waveguide structure to an optical chip wherein alignment is achieved using reference means. This publication however does not relate to alignment of a device and a layer stack comprising an embedded waveguide structure, as is the case for a hybrid backplane.

BRIEF DESCRIPTION OF THE DRAWINGS

The embodiments of the invention will be described into more detail below with reference to the attached drawing of which FIG. 1 schematically illustrates the concept of an hybrid optical backplane;

FIGS. 2A-F schematically illustrate various approaches to deflect an optical signal between optical paths;

FIGS. 7A-F show an optical connector assembly including an optical connector of a mating device according to an embodiment of the invention.

DETAILED DESCRIPTION OF THE INVENTION

Figure 1:
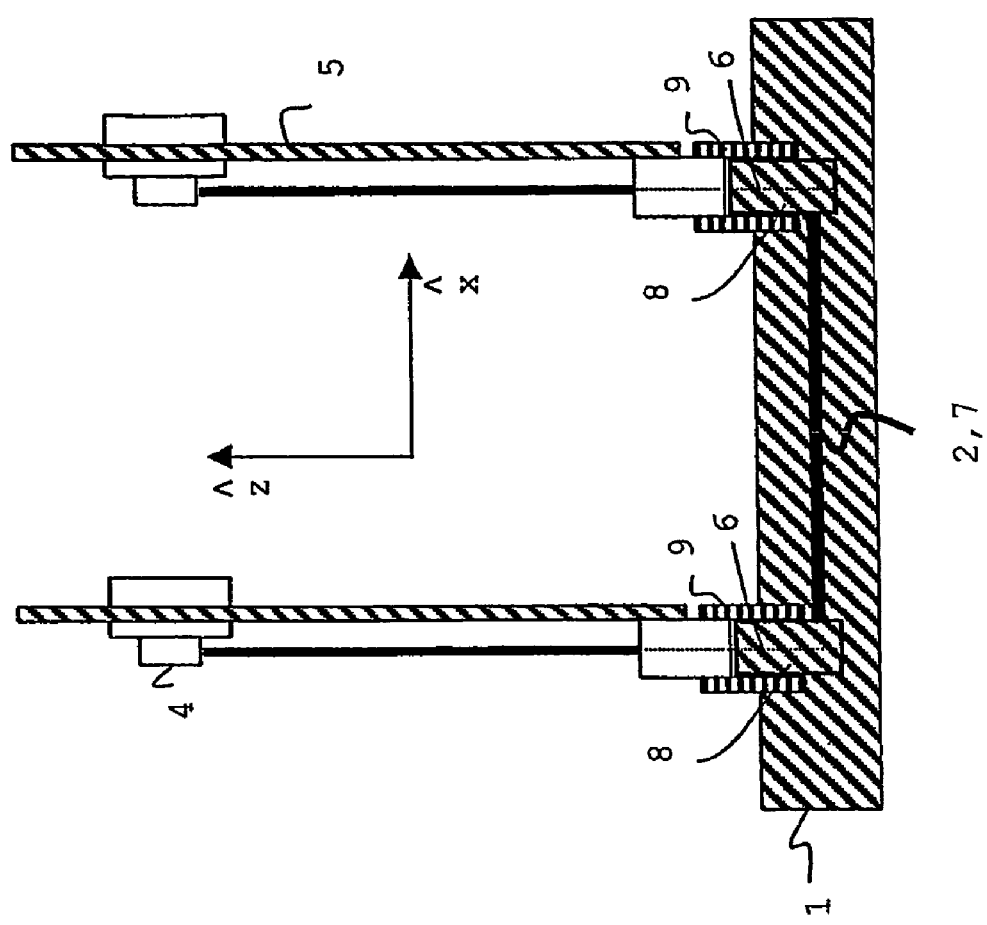

FIG. 1 shows a hybrid optical backplane or PCB 1, which is a layer stack comprising several layers. Hereinafter this backplane 1 will also be referred to as layer stack 1. The layer stack 1 comprises at least one optical waveguide 2 which may be part of a waveguide structure 3 (see FIG. 3A) comprising multiple waveguides 2. The waveguide 2 is positioned in a x-y plane, which is the plane perpendicular to the figure in this case. Waveguide 2 or waveguide structure 3 is integrated or embedded in at least one of the layers of the layer stack 1. Embedded waveguides 2 may be polymer waveguides, glass sheet waveguides or waveguides obtained by embedded fibre technology.

Optical signals, transferred to or from a mating optical device, such as an optical device or optoelectrical device 4 or an other PCB 5, are provided over a first optical path 6 to the waveguide 2 of the layer stack 1, which waveguide 2 provides a second optical path 7 to the optical signal. In order to achieve an optimal optical coupling between the first and second optical path, that are perpendicular to each other for the hybrid optical backplane here, a coupling device 8 is provided for alignment purposes. Pre-alignment means are indicated with 9. The coupling device 8 and the way in which this coupling device 8 is aligned with the waveguide 2 will be described in further detail hereinafter.

In order to enable the optical signal to be deflected between the first optical path 6 oriented in the z-direction and the second optical path 7 oriented in the x-direction, various approaches can be taken. Examples of these approaches are schematically illustrated in FIGS. 2A-F. It is noted that although only perpendicular deflection is illustrated, other deflection angles are possible as well. The arrows indicate the optical signals.

The waveguide 2, being part of layer stack 1, comprises a top cladding layer 10, a waveguide core 11 and a bottom cladding layer 12. Layer stack 1 may comprise various other layers below and/or above the waveguide 2. Such a layer is e.g. copper layer 13, deposited below the waveguide 2. Moreover the layer stack 1 may comprise several waveguides 2 or waveguide structures 3 in the z-direction.

In FIGS. 2A-D deflection of optical signals between the first optical path 6 and the second perpendicular optical path 7 may be achieved by employing a reflective layer 14 on a facet of the waveguide structure 3.

FIGS. 2A and 2C show that reflective layer 14 can be applied such that optical signals exhibit internal reflection, i.e. the optical signals are substantially confined in the waveguide 2 upon reflection at the reflective layer 14. In FIG. 2C the internally reflective layer 14 is combined with a coupling device 8 comprising an optical component 15 such as a lens or lens array.

FIGS. 2B and 2D show the variant wherein the reflective layer 14 is applied such that the optical signals exhibit external reflection, i.e. reflection takes place outside of the waveguide 2. The space 16 is preferably filled with a material having the same refractive index as the waveguide core. Again an optical component 15 can be applied as a part of the coupling device 8, as shown in FIG. 2D.

FIGS. 2E and 2F illustrate another approach for deflecting optical signals between a first optical path 6 and a second optical path 7 over ninety degrees. Here, a mirror mount 17 is used that can be placed within the first and second optical path. Mirror mount 17 refers to any component able to deflect an optical signal and thus may refer e.g. to a grating or a prism as well. Waveguide 2 is adapted to accommodate this mirror mount 17. The space 16 through which the optical signal travels preferably is filled with an index matching material once more. The mirror mount 17 can be integrated with a coupling device a comprising an optical component 15 such as a lens or lens array, as shown in FIG. 2E, as well as being as separate component, as shown in FIG. 2F. The mirror mount 17 may also be used without the optical component 15.

It is to be noted that in using the separate mirror mount 17, z-axis control becomes an issue, since the waveguide 2 and the reflective interface of the mirror mount 17 are not automatically lined up as for the internal or external reflection approach. In FIG. 2E this problem is illustrated by the dashed line of the mirror mount 17 and the resulting optical signal. It is observed that if the mirror mount 17 is not adequately positioned, i.e. the position of the mirror mount 17 in the z-direction is not in line with the second optical path 7, a shift of the optical signal in the x-direction may result. This problem is specifically addressed in the second and third embodiment of the invention, displayed in FIGS. 4 and 5.

The application of one or more optical components 15 may enhance or optimise the optical coupling between the first optical path 6 and the second optical path 7. Lenses or lens arrays can e.g. be used to collimate diverging light beams thereby avoiding optical loss.

Figure 3A:
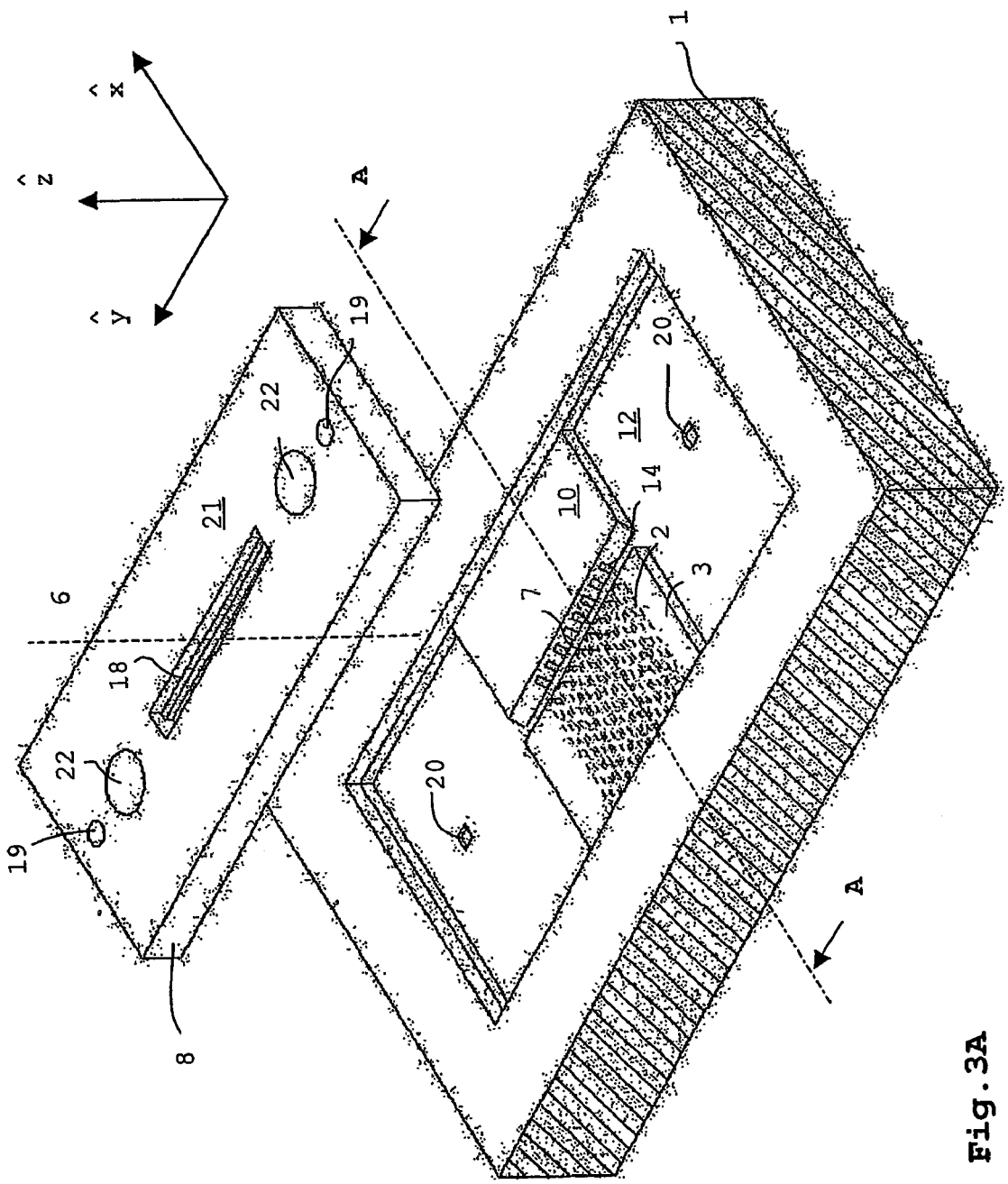
FIGS. 3A, B show a first embodiment of the optical connector assembly according to the invention.
Figure 3B:
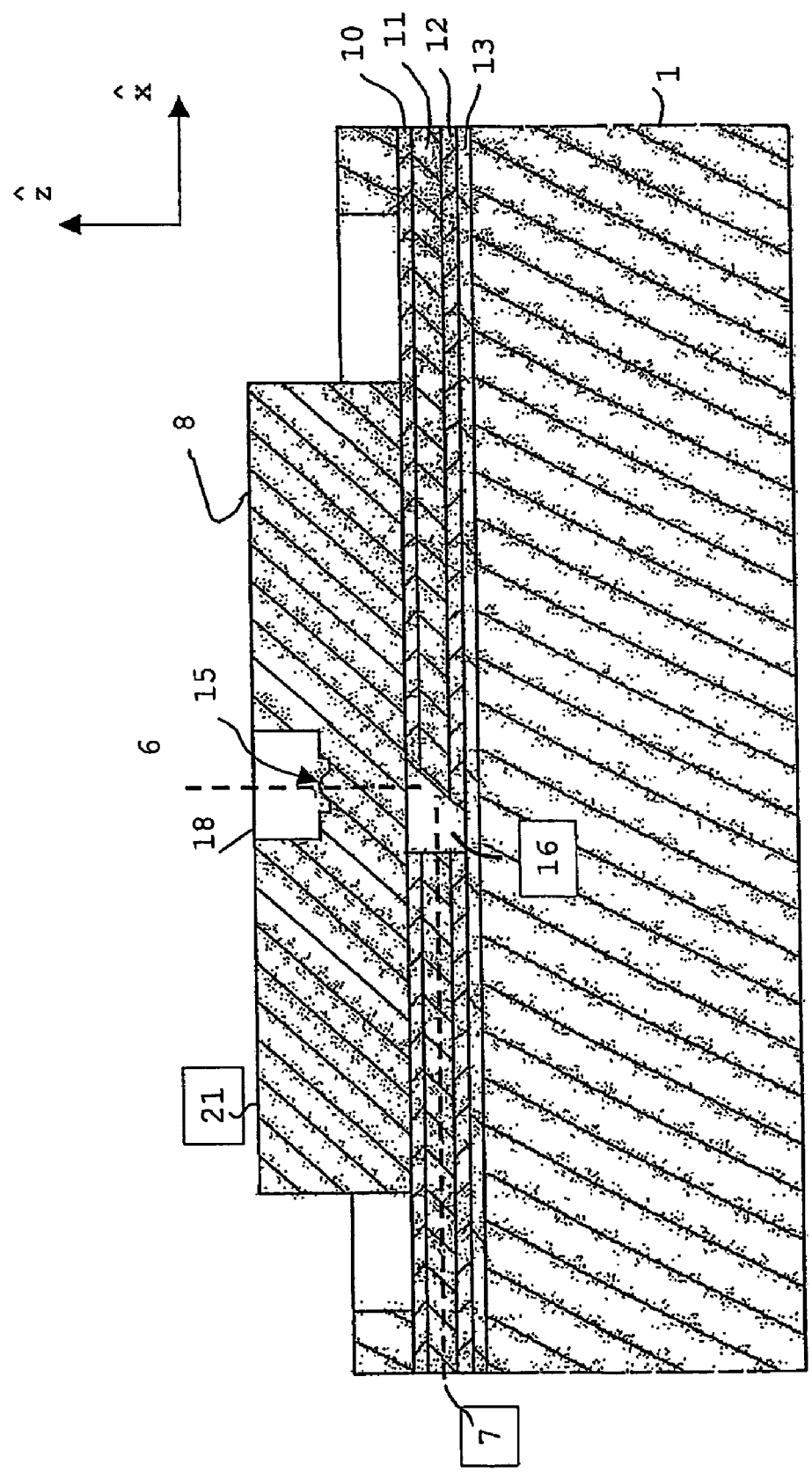

In FIGS. 3A and 3B a first embodiment of the optical connector assembly according to the invention is displayed. Layer stack 1 comprises a waveguide structure 3 having various waveguides 2. Waveguides 2 comprise a top cladding layer 10, a waveguide core 11 and a bottom cladding layer 12. Cladding layers 10 and 12 are present outside the waveguide structure 3 as well as to form a part of the layer stack 1. The facets of the waveguide comprise a reflective layer 14 for employing the external deflection approach as explained above. By applying the reflective layer 14 on a facet of the waveguide itself, no measures have to be taken to control the position of the reflective layer in the z-direction. The importance of z-direction control of a reflective surface was illustrated in FIG. 2E.

The optical connector assembly further comprises a coupling device 8 providing a first optical path 6 via an area 18. The area 18 may comprise a cavity and may be used to employ an optical component 15, such as a lens array for optimising the optical coupling of the optical signals of the waveguides 2. The lens or lens array may be provided in the cavity as a separate component or may form an integral part of the coupling device 8. The area 18 may as well be a region transparent to the optical signals transmitted over the first optical path 6.

Coupling device 8 comprises first reference means 19 used for aligning coupling device 8 in both the x-direction and the y-direction with the waveguide structure 3 of the layer stack 1. This alignment is performed by applying second reference means 20 in a layer of the layer stack 1. In general, the second reference means 20 are applied in such a layer in a predetermined x-direction and y-direction relative to the waveguide structure 3 such that when these second reference means 20 co-operate with the first reference means 19, optimal optical coupling is achieved between the first optical path 6 and the second optical path 7. Preferably the second reference means 20 define a line parallel to the y-direction and perpendicular to the second optical path 7. The first reference means 19 on the coupling device 8 are manufactured to define a line parallel to the y-direction and the longitudinal axis of the area 18 as well and at a predetermined position in the x-direction, such that the second reference means 20 may coincide with the first reference means 1920 during alignment.

Preferably the second reference means 20 are located in the same layer of the layer stack 1. In this embodiment this layer is the bottom cladding layer 12 of the waveguide structure 3. It is advantageous to use such a layer of the waveguide structure 3, since in that case the second reference means 20 can be applied simultaneously with or subsequently to one of the process steps for manufacturing the waveguide structure 3. These second reference means 20 can be accurately applied in the preferred layer by using laser ablation or photolithography, being convenient techniques of manufacturing a waveguide structure 3. It will be appreciated that the second reference means 20 should remain available for alignment if further layers complete the layer stack 1. This may be done by covering the second reference means 20 and making them available after the layer stack 1 is completed. Alternatively the second reference means 20 can be applied on top of the layer stack 1. This provides the advantage of easy accessibility if the coupling device 8 is to be positioned on the layer stack 1. In yet another alternative, the second reference marks 20 can be applied in the copper layer 13, underneath the bottom cladding layer 12 of the waveguide 2 or another layer. The second reference means 20 can also be applied on top of the top cladding layer 10 or on top of the mirror mount 17, as shown in FIGS. 7B and 7C.

The first reference means 19 and second reference means 20 preferably are guide reference means or index reference means. The first reference means 19 may e.g. be guide pins, fitting in the second reference means 20 being guide holes. In a variant, both the first reference means 19 and the second reference means 20 may be guide holes whereas separate guide pins are provided if the coupling device 8 is coupled to the layer stack 1. Alternatively, the first reference means 19 and the second reference means 20 are index reference means, being marks visible for machine placing of the coupling device 8 on the layer stack 1. These marks can advantageously be applied during manufacturing of the waveguide structure 3, since in that case accurate positioning of these marks with respect to the waveguide structure can be achieved. In FIG. 3A the first reference means 19 and second reference means 20 are index reference means.

Preferably the first reference means 19 and second reference means 20 do not exhibit a substantial dimension in the x-y plane (typically only a few microns), to facilitate simultaneous alignment in both the x-direction and the y-direction.

In FIG. 3B a cross-section across line A-A of FIG. 3A is shown, wherein the coupling device 8 is positioned, using the first and second reference means, in or on the layer stack 1 according to the invention. The three-dimensional representation of this case in shown in FIG. 6.

Coupling device 8 further comprises a reference plane 21 comprising third reference means 22. These third reference means 22 are further discussed below with respect to FIGS. 7A-D.

Figure 4A:
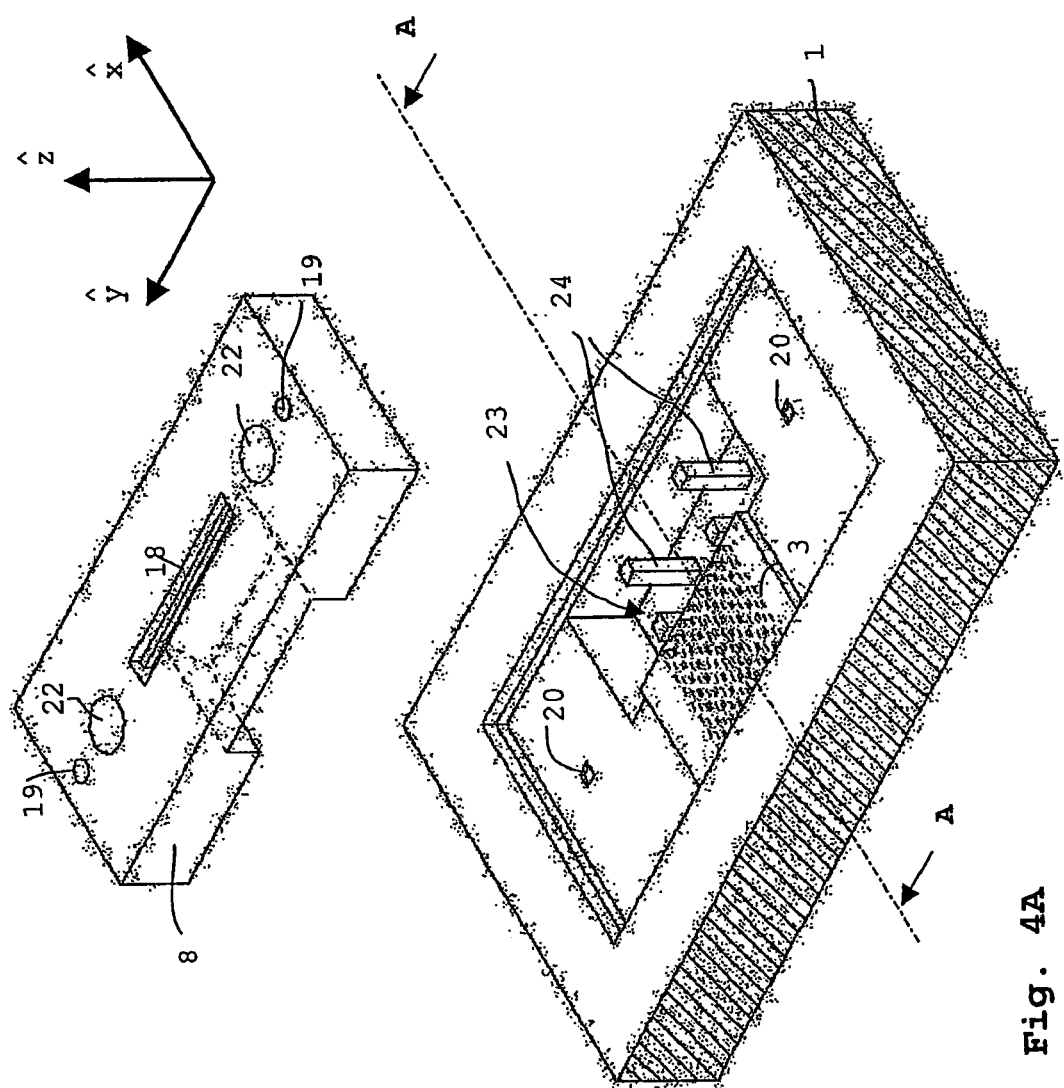
FIGS. 4A-D show a second embodiment of the optical connector assembly according to the invention.

In FIG. 4A a second embodiment of an optical connector assembly according to the invention is displayed. Most parts and features of the optical connector assembly shown, have already been discussed above for the first embodiment and are indicated with the same reference numerals. In FIG. 4A, the deflection approach discussed with respect to FIG. 2E is used. In this approach, a mirror mount 17 is integrated in the coupling device 8 to deflect optical signals between the first optical path 6 and the second optical path 7, preferably together with an optical component 15 such as a lens or lens array. As was already discussed above with respect to FIG. 2E, this approach brings up the issue of the z-axis control for the mirror mount 17, since the absence of a control mechanism for the z-direction may result into misalignment in the x-y plane.

Apart from the features already discussed for FIG. 3A, the second embodiment exhibits a space 23 in the layer stack 1 accommodating support structures 24 that may be obtained from this layer stack 1. These features can also be observed from the cross-section A-A, displayed in FIG. 4B, where the coupling device 8 is positioned by matching the first reference means 19 with the second reference means 20.

Figure 4B:
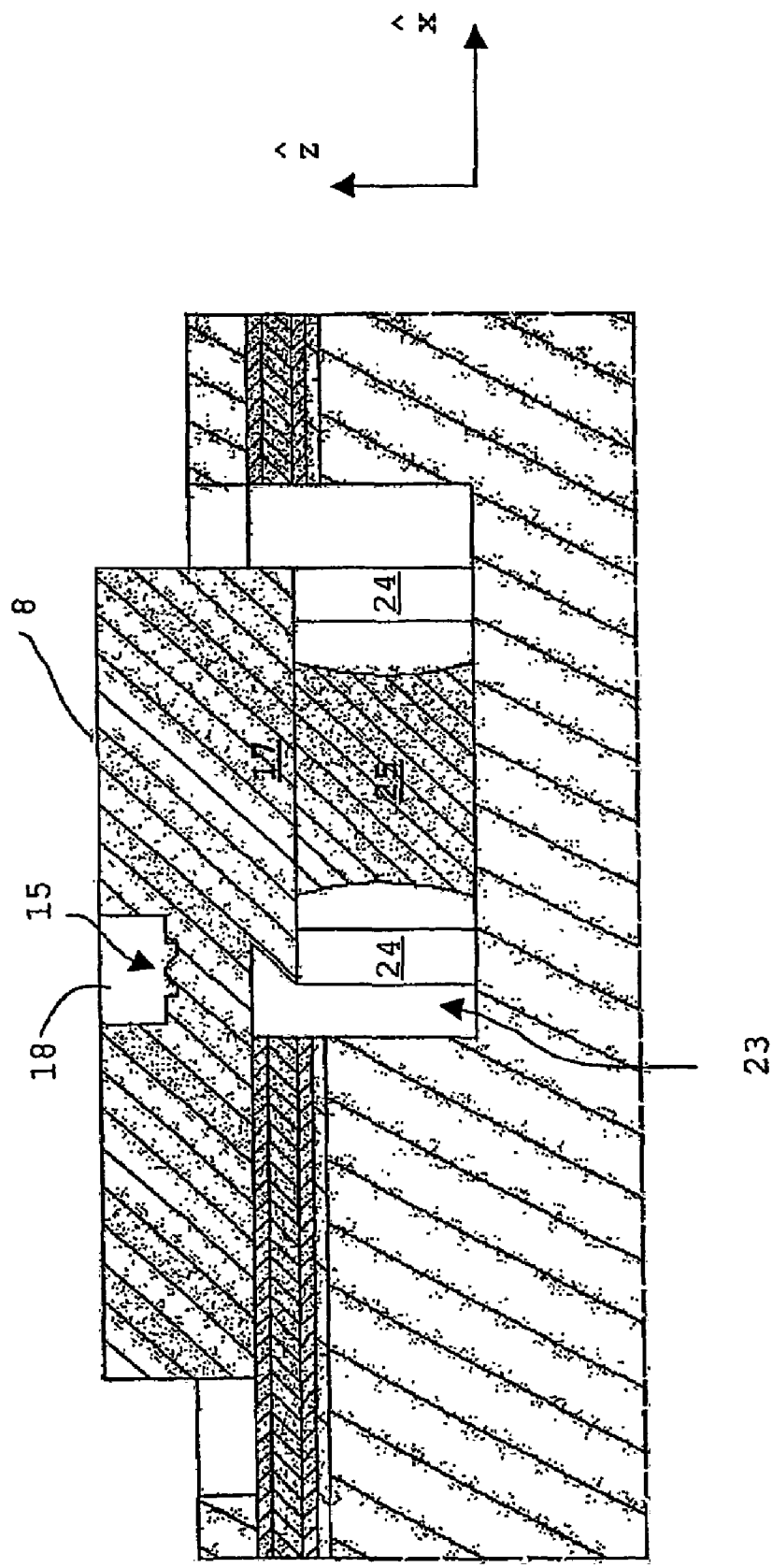

Z-axis control is effectively achieved by defining support structures 24 in the space 23 underneath the mirror mount 17. The mirror mount 17 is positioned in accordance with the second optical path 7, by removing layers from the layer stack 1, except from the support structures 24 providing the height or z-axis control. These layers of the layer stack 1 can be removed by e.g. laser ablation, grinding or etching in the region where the mirror mount 17 is envisaged to be positioned. If e.g. only the bottom cladding layer 12 is removed, accurate z-axis positioning can be achieved. More layers of the layer stack 1, such as copper layer 13, may be removed as well; this situation is illustrated in FIG. 4B. In order to keep the mirror mount 17 in accurate position with respect to the second optical path 7, an adhesive material 25 can be applied in the space 23. Such an adhesive material may be an epoxy fill. If this epoxy hardens, a downward, pulling, force is exerted on the mirror mount 17.

Figure 4C:
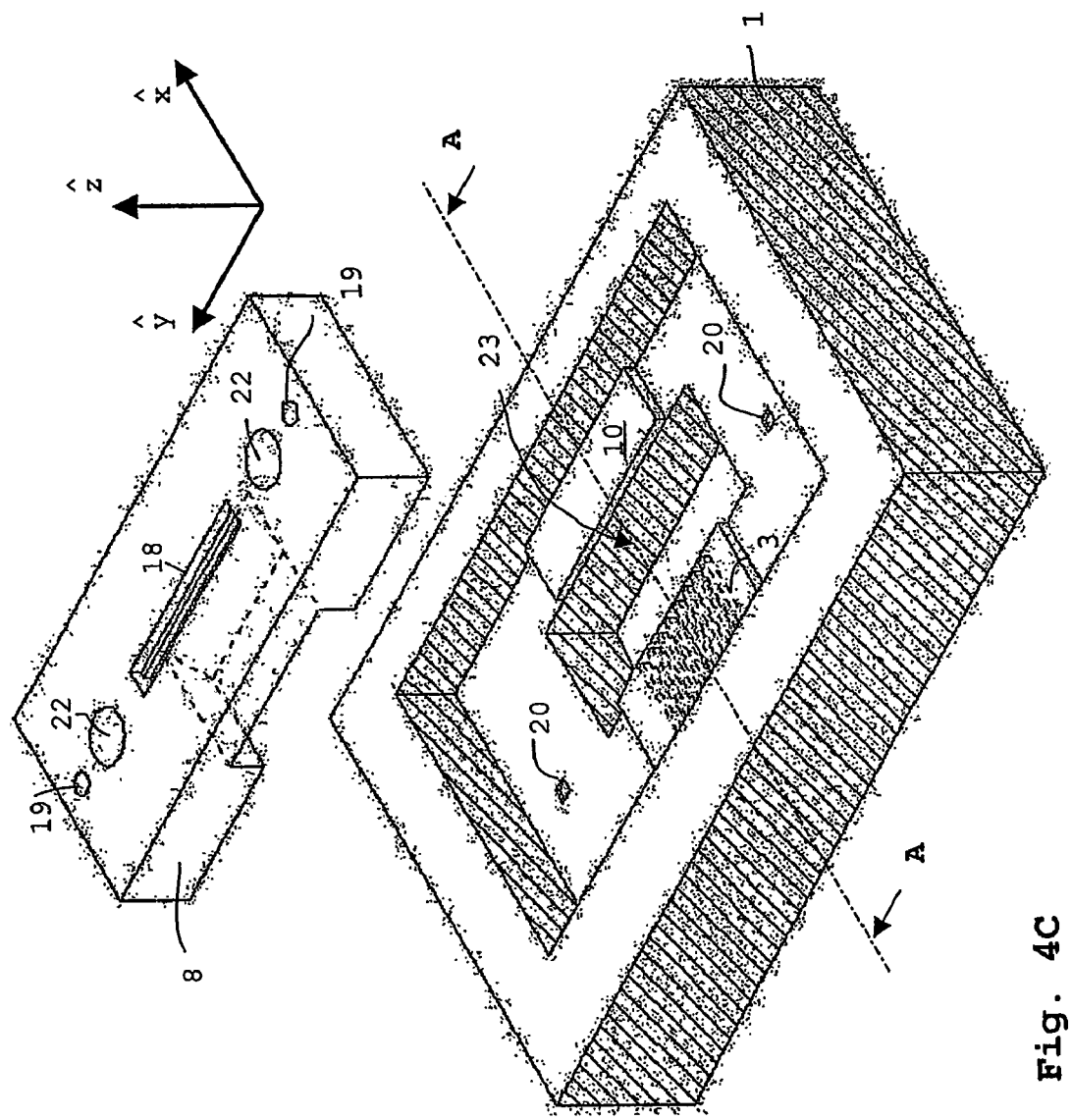
Figure 4D:
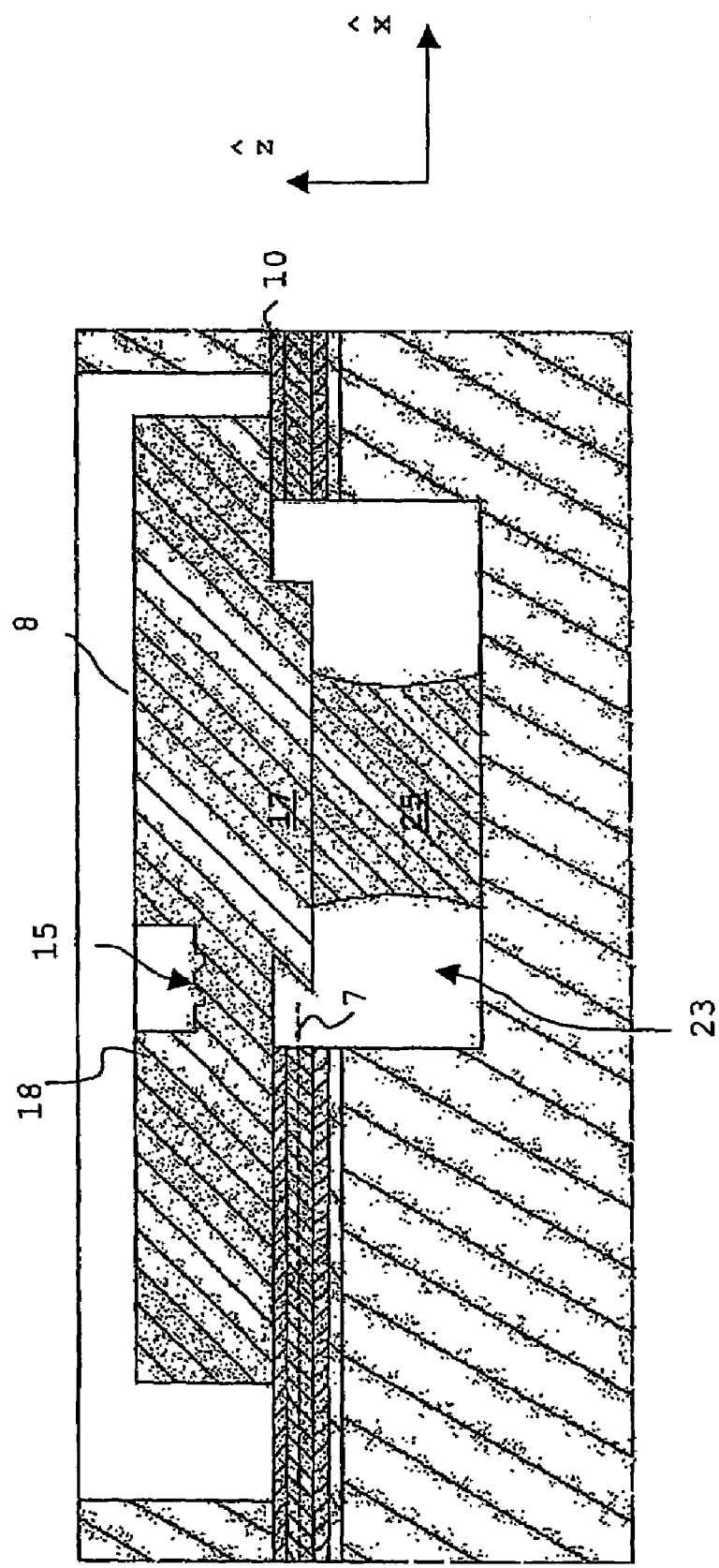

As shown in FIGS. 4C and D, the mirror mount 17 can be positioned in the second optical path 7 without the support structures 24. Alternatively, layers of the layer stack 1 support the mirror mount 17. In FIGS. 4C and 4D the top cladding layer 10 of the waveguide structure 3 has been used to position the mirror mount 17 in the second optical path 7.

Figure 5A:
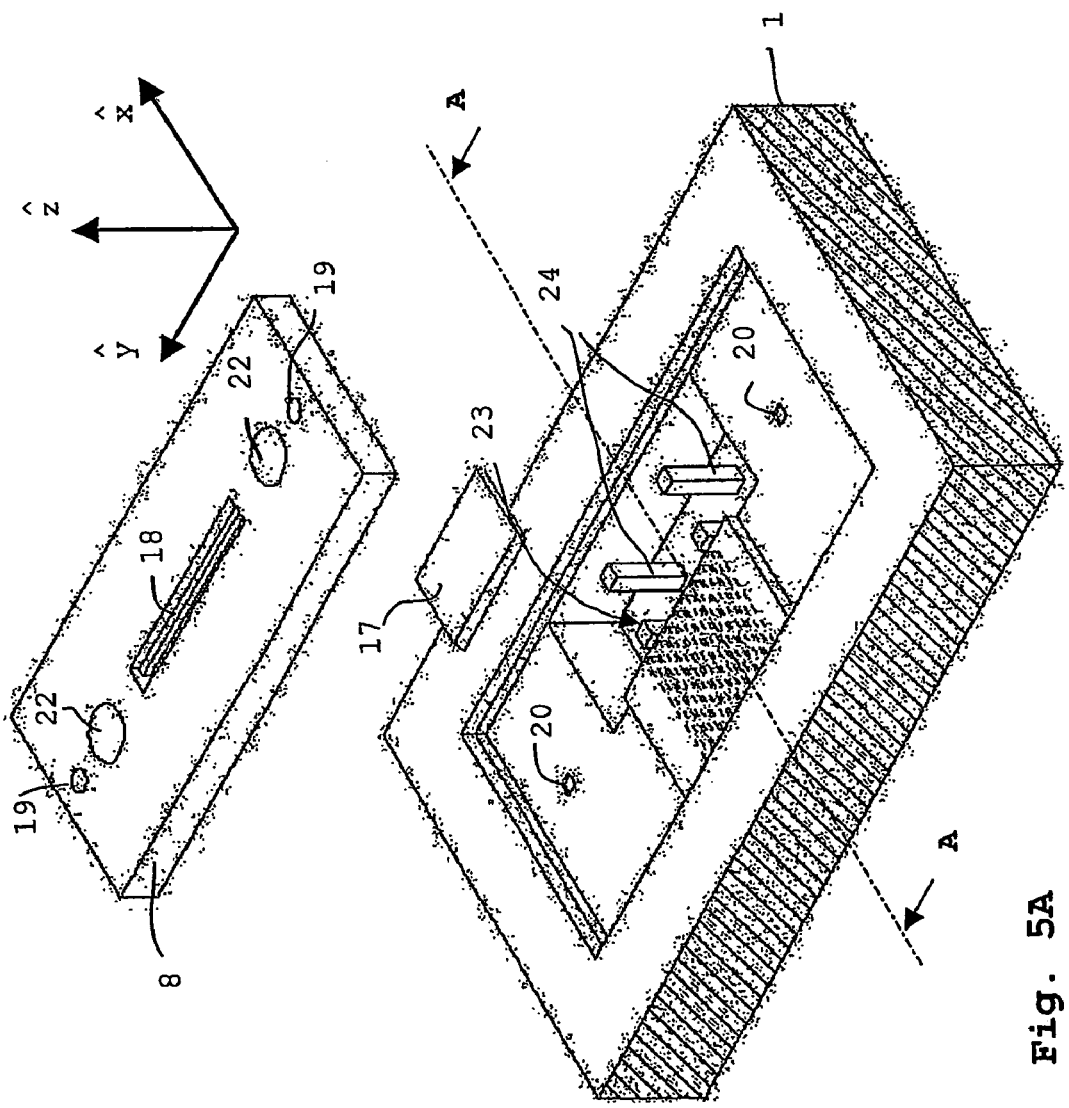
FIGS. 5A-C show a third embodiment of the optical connector assembly according to the invention.

In FIG. 5A a third embodiment of an optical connector assembly according to the invention is displayed. Most parts and features of the optical connector assembly shown, have already been discussed above for the first and second embodiment and are indicated with the same reference numerals. In FIG. 5A, the deflection approach discussed with respect to FIG. 2F is used. In this approach, a separate mirror mount 17 is applied to deflect optical signals, before the coupling device is attached to the layer stack 1.

Figure 5B:
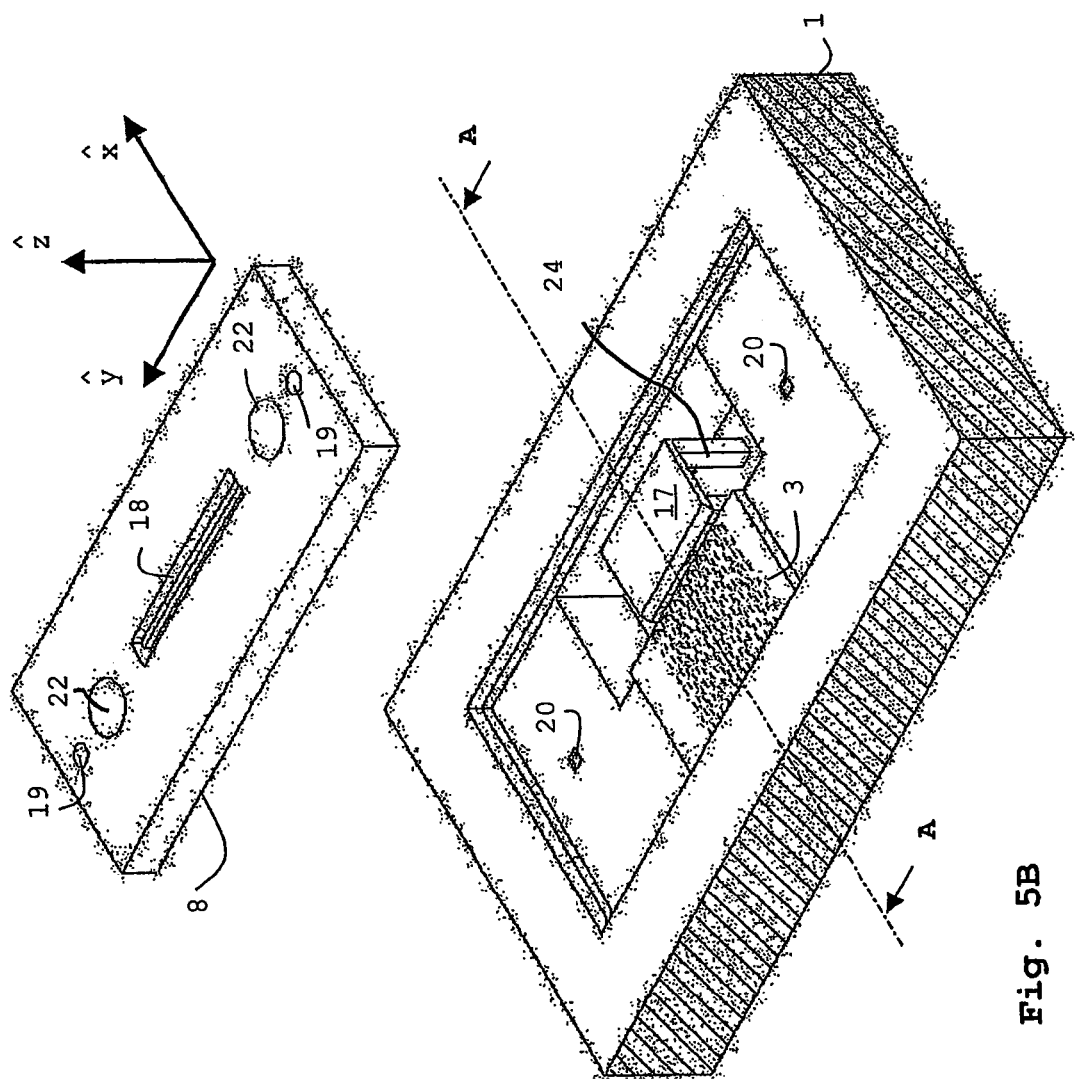

In FIG. 5B the situation is shown wherein the mirror mount 17 is brought in position. This positioning can be achieved by providing the mirror mount 17 with reference means (not shown). These reference means may first be used for picking up the mirror mount 17 by a pick and place machine. Subsequently the separate mirror mount 17 is brought in position by this machine, e.g. by using the second reference means 20 as a reference. The mirror mount 17 may comprise further reference as well in order to accurately position a (provisional) optical component 15, having corresponding reference means, afterwards. As mentioned previously, the mirror mount 17 may comprises the second reference means 20, as shown in FIGS. 7B and 7C. In this case these second reference means 20 can also be used to perform the above identified tasks.

Figure 5C:
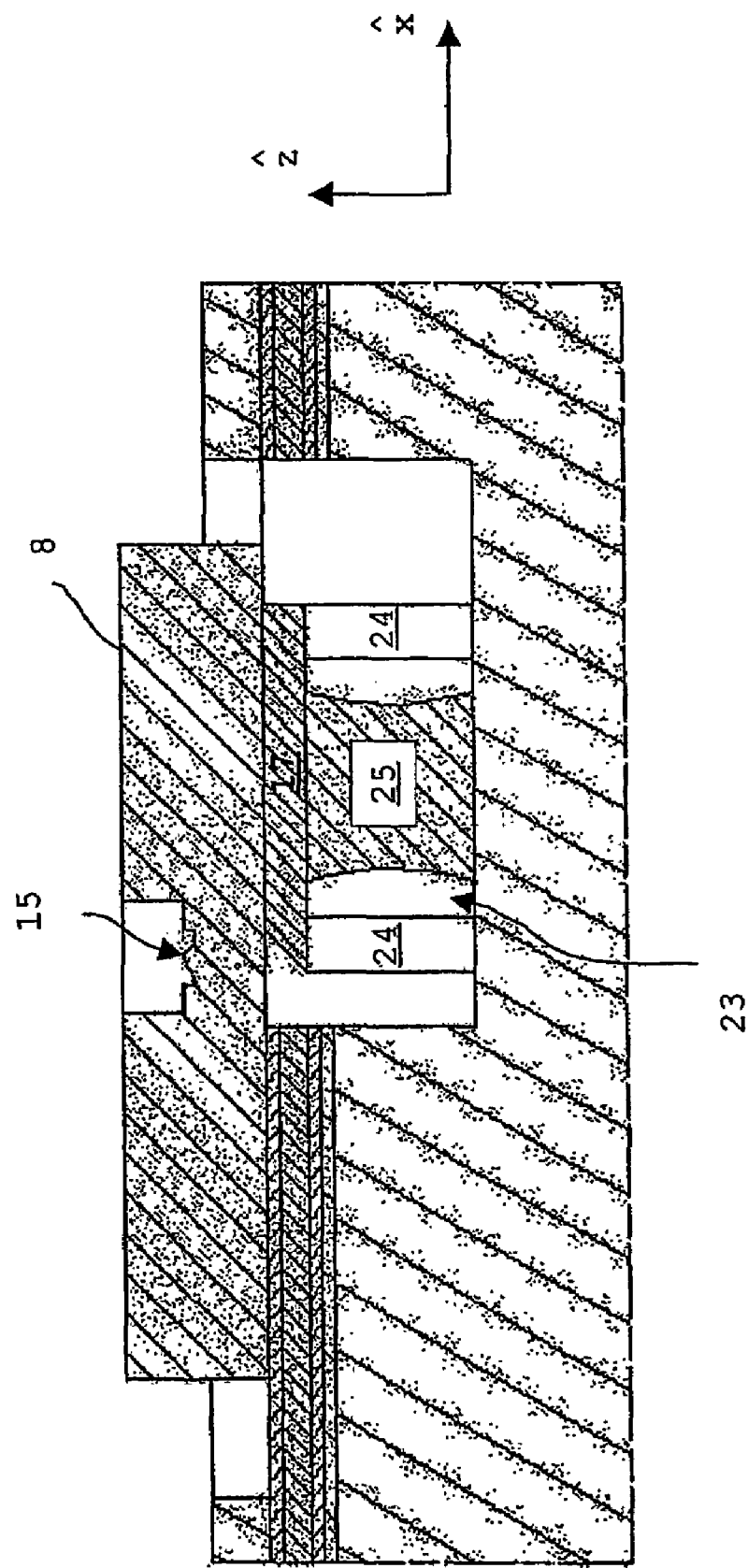

As was already discussed above with respect to FIG. 2E and FIG. 4A, placing of a mirror mount that is not automatically in position with respect to the second optical path 7 in the z-direction, brings up the issue of the z-axis control for the mirror mount 17, since the absence of a control mechanism for the z-direction may result into less optimal optical coupling between the first optical path 6 and the second optical path 7 in the x-direction. As shown in FIG. 5C, which displays a cross-section A-A identified in FIGS. 5A and 5B, the means applied here for z-direction control may be similar to the ones applied in the second embodiment.

Figure 6:
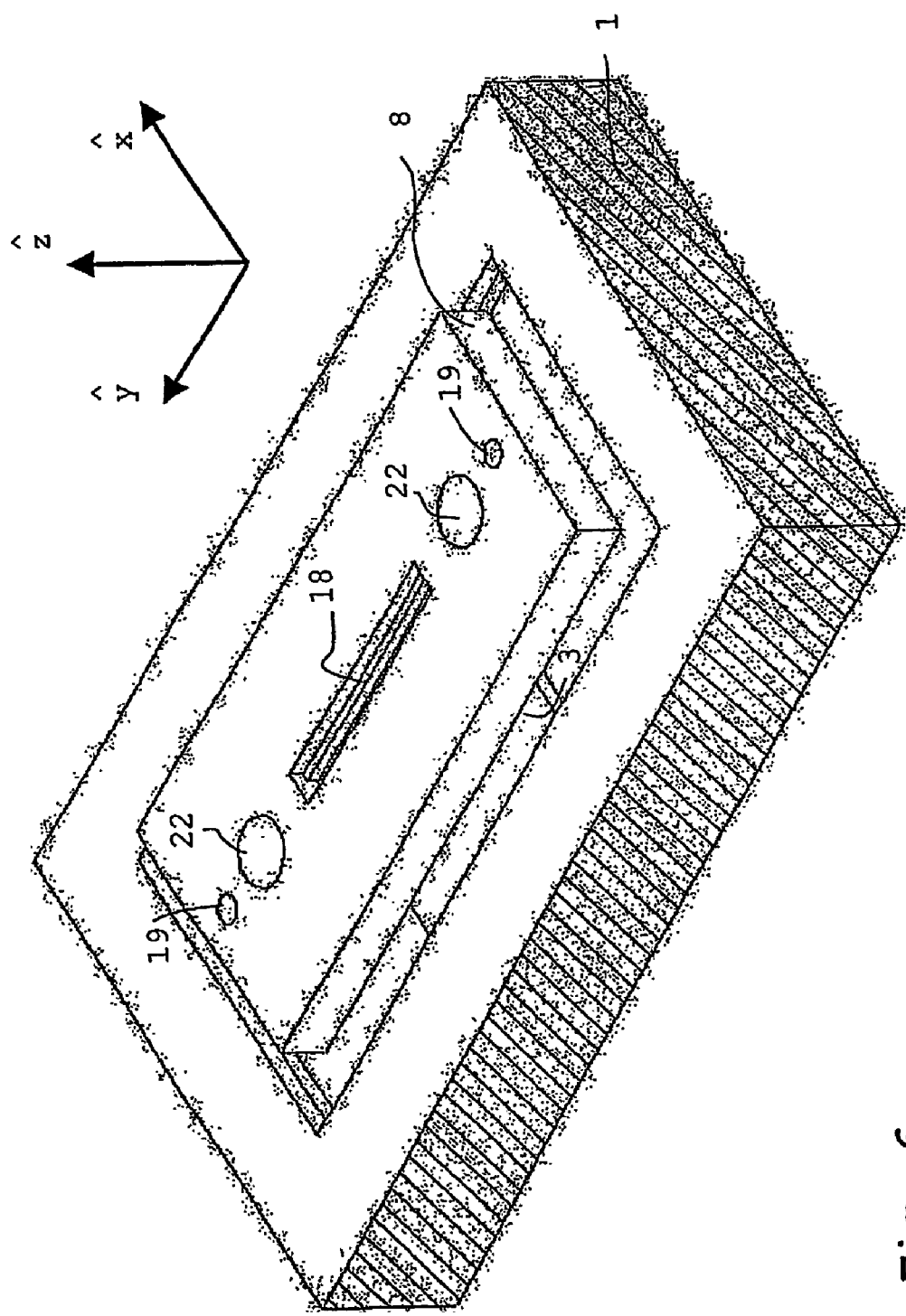
FIG. 6 shows the coupling device coupled to the layer stack.

After positioning, the coupling device 8 may be fixed to the layer stack 1. This can be performed by applying adhesive material 25 under the coupling device 8. Since this adhesive material may fill the space 16, located in both optical paths 6 and 7, preferably an index matching material, such as epoxy, may be used. In FIG. 6, the optical connector assembly is shown for the first, second and third embodiment wherein the coupling device 8 has been fixed to the layer stack 1.

Figure 7A:
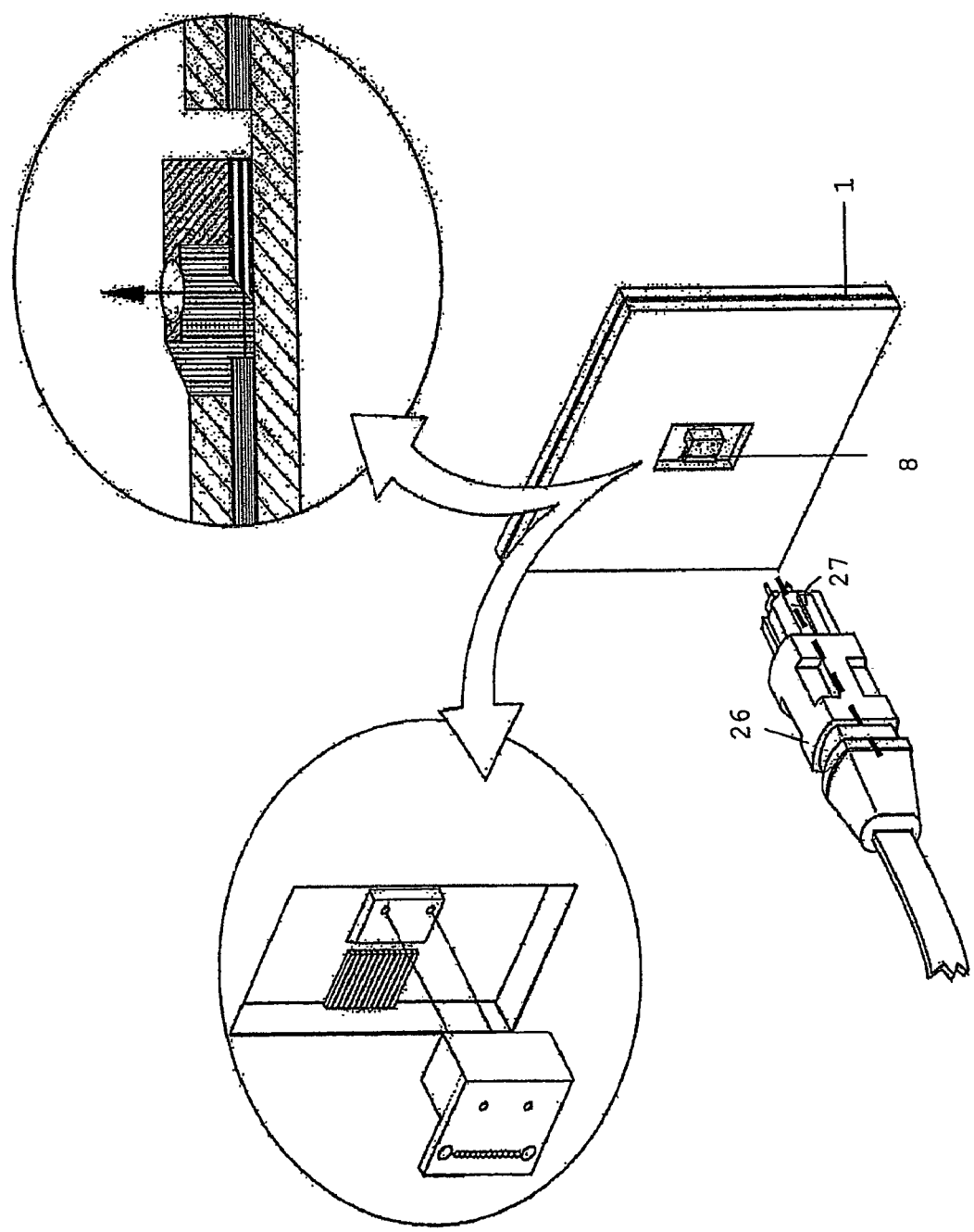
Figure 7C:
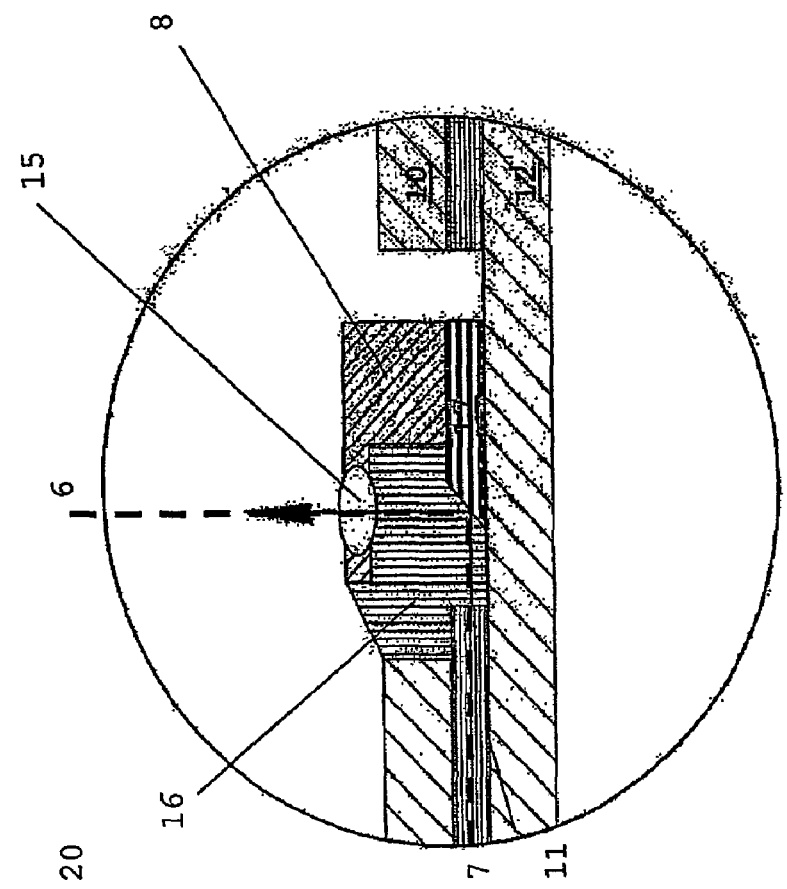
Figure 7B:
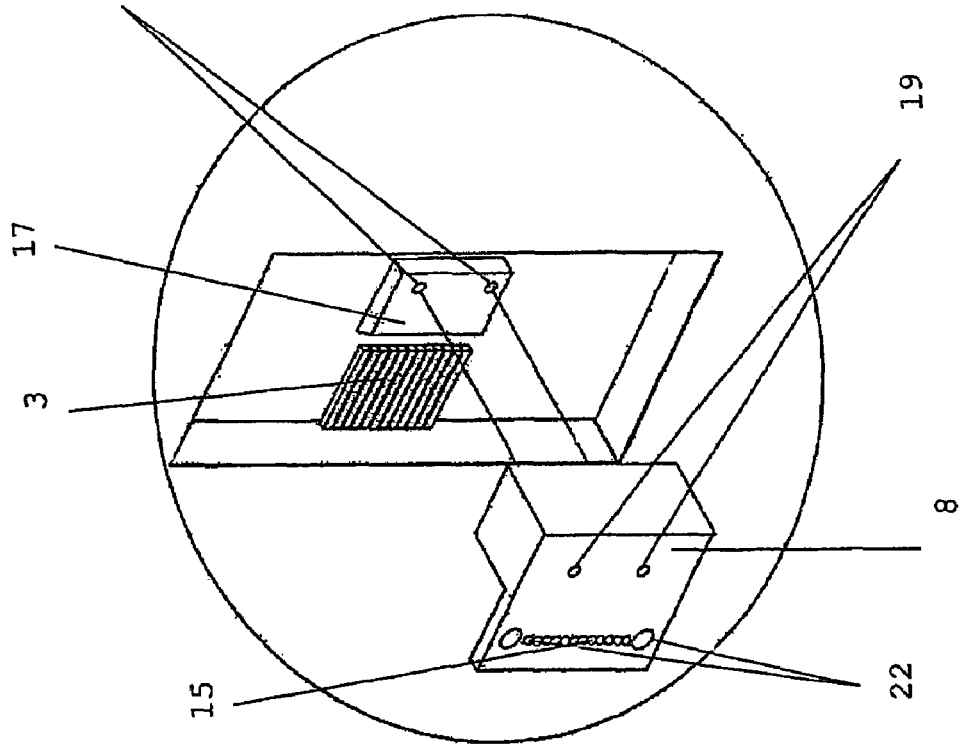
Figure 7D:
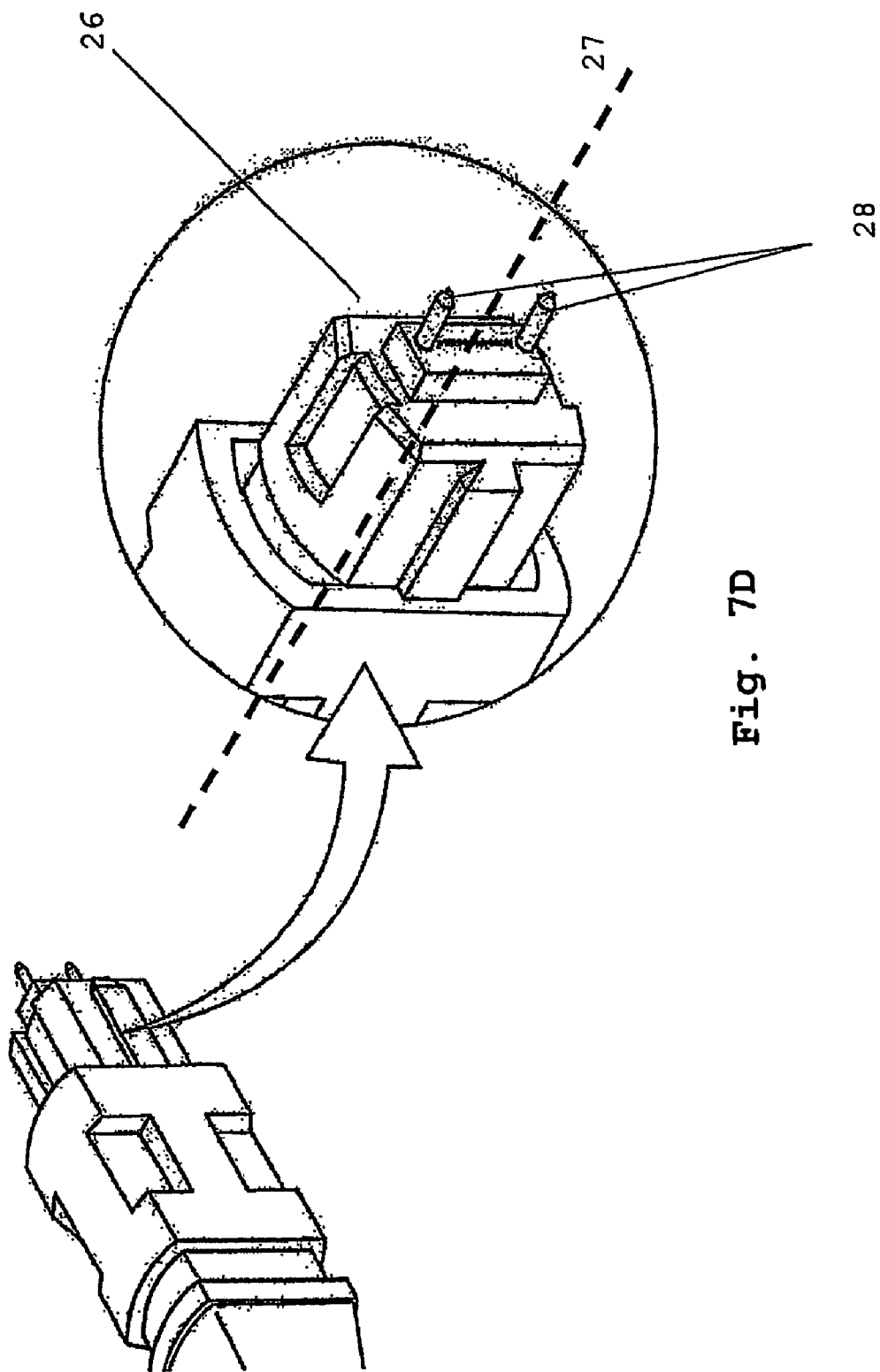

In FIGS. 7A-D an embodiment of the optical connector assembly is shown, wherein the assembly further includes an optical connector 26 of a mating device (not shown), providing a third optical path 27. In FIG. 7A an overview of the optical connector assembly is displayed, while FIGS. 7B-D show detailed parts of the assembly.

In FIG. 7A the layer stack 1 is shown with the coupling device 8 on top. Optical connector 26 providing the third optical path 27 to a mating device is intended for optically coupling to the waveguide structure 3 in the layer stack 1.

FIGS. 7B and 7C show detailed views of the layer stack 1 in accordance with FIG. 7A. FIGS. 7B and 7C correspond to the embodiments shown in the FIGS. 5A-C. For the sake of simplicity, mirror mount 17 is simply put on top of the cladding layer, thereby disregarding the z-axis control issue. Mirror mount 17 comprises the second reference means 20 for aligning the coupling device 8 to the waveguide structure 3 as to couple the first optical path 6 of the coupling device 8 and the second optical path 7, provided by the waveguide structure 3. Coupling device 8 comprises the first reference means 19 for this alignment and further incorporates a lens array 15, wherein a lens is provided for each waveguide 2 of the waveguide structure 3. First reference means 19 and second reference means 20 are index reference means. Coupling device 8 further comprises third reference means 22 in order to align optical connector 26 with the coupling device 8.

Alignment of the optical connector 26 with the coupling device 8 is achieved by providing the optical connector 26 with fourth reference means 28, shown in FIG. 7D. The third reference means 22 and fourth reference means 28 are adapted such that good optical coupling is achieved between the second optical path 7 and the third optical path 27. It is noted that upon connection of the mating device, the coupling device 8 may be a part of the layer stack 1, the pre-alignment means 9 or the optical connector 26.

In FIGS. 7E and 7F an embodiment of the invention is depicted, wherein the layer stack 1 comprises, two waveguide structures 3 in a single x-y plane of the layer stack 1. A single mirror mount 17 is placed between the waveguide structures 3 with the reflecting surfaces facing the waveguide structures 3. The mirror mount 17 comprises second reference means 20 for alignment of the coupling device 8 with the waveguide structures 3. The waveguide structures 3 each provide a second optical path 7. Coupling device 8 provides two first optical paths 6 and first reference means 19 for the alignment. The space 16 is preferably filled with a material having the same refractive index as the waveguide core 11. Moreover the coupling device 8 comprises two optical components 15, which are lens arrays in this case. Finally the coupling device 8 comprises third reference means 22 adapted to co-operate with the fourth reference means 28 of an optical connector 26 similar to that shown in FIG. 7D (but provided with a duplex arrangement of the relevant parts, such as the fourth reference means 28 and the means for providing two third optical paths 27).

As was mentioned above, layer stack 1 may comprise, in the z-direction, multiple waveguide structures 3 in several, substantially parallel, x-y planes. FIGS. 8A-D illustrate various embodiments according to the invention, wherein a layer stack 1 comprises two waveguide structures 3 in the z-direction, showing only the intersection with a single waveguide 2. It should be appreciated that the invention also can be applied for more than two waveguide structures in the z-direction.

Figure 8A:
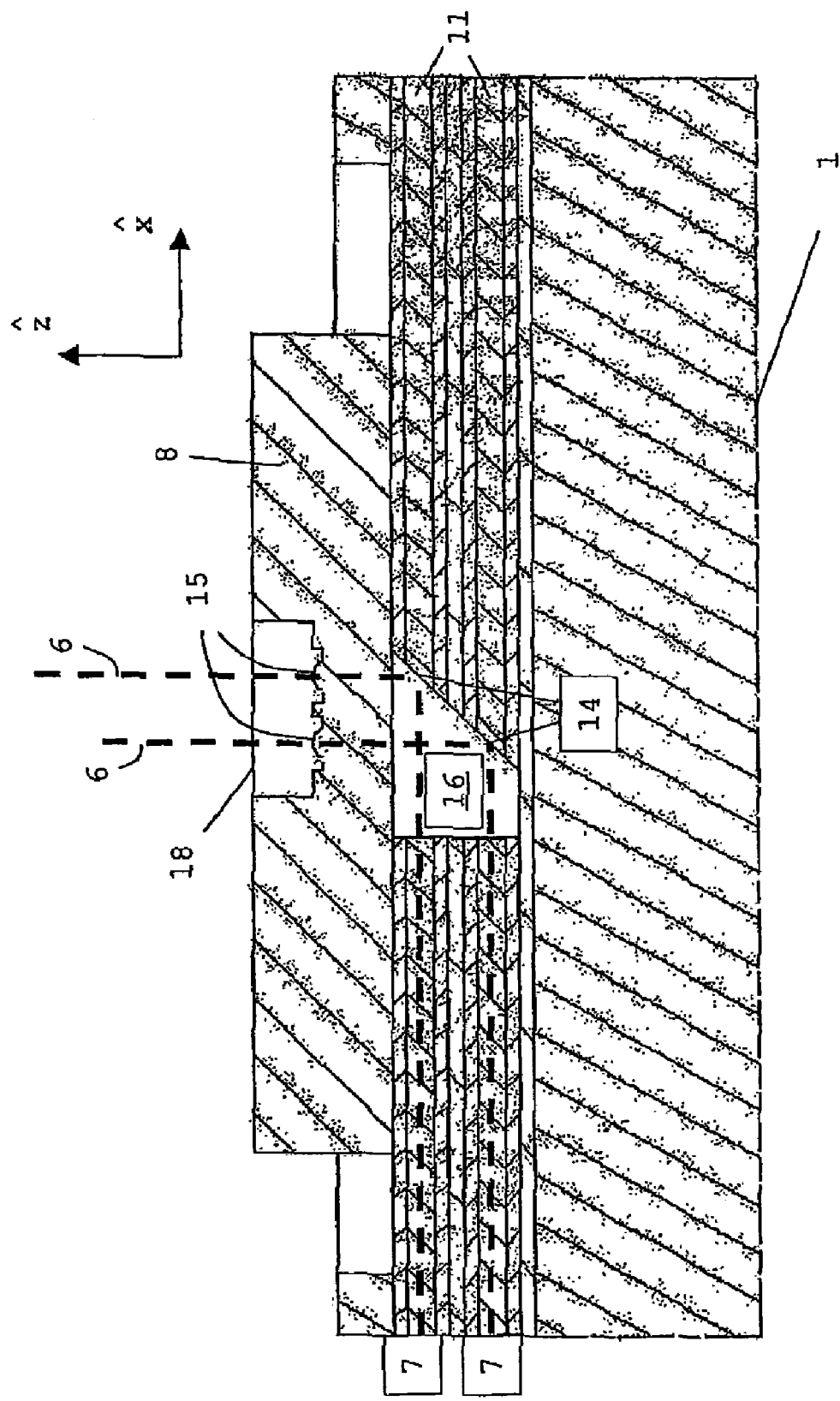
FIGS. 8A-D show a fourth embodiment of the optical connector assembly according to the invention.

In FIG. 8A the layer stack 1 comprises two waveguides 2 or waveguide structures 3 above each other. Each waveguide 2 provides a second optical path 7. Optical signals travelling along these second optical paths 7 are deflected by reflective layers 14, at least being applied on the facets of the waveguides 2. Coupling device 8 comprises an area 18 and provides two first optical paths 6 through optical components 15 accommodated in the area 18. The optical components 15 are lenses in this case. The space 16 is preferably filled with a material having the same refractive index as the waveguide core 11. Alignment of the coupling device 8 to the waveguides 2 or waveguide structures 3 as to optically couple the first optical paths 6 and the corresponding second optical paths 7 in both the x- and y-direction of the x-y plane is performed similar to the alignment process describes with reference to FIG. 3A-C.

Figure 8B:
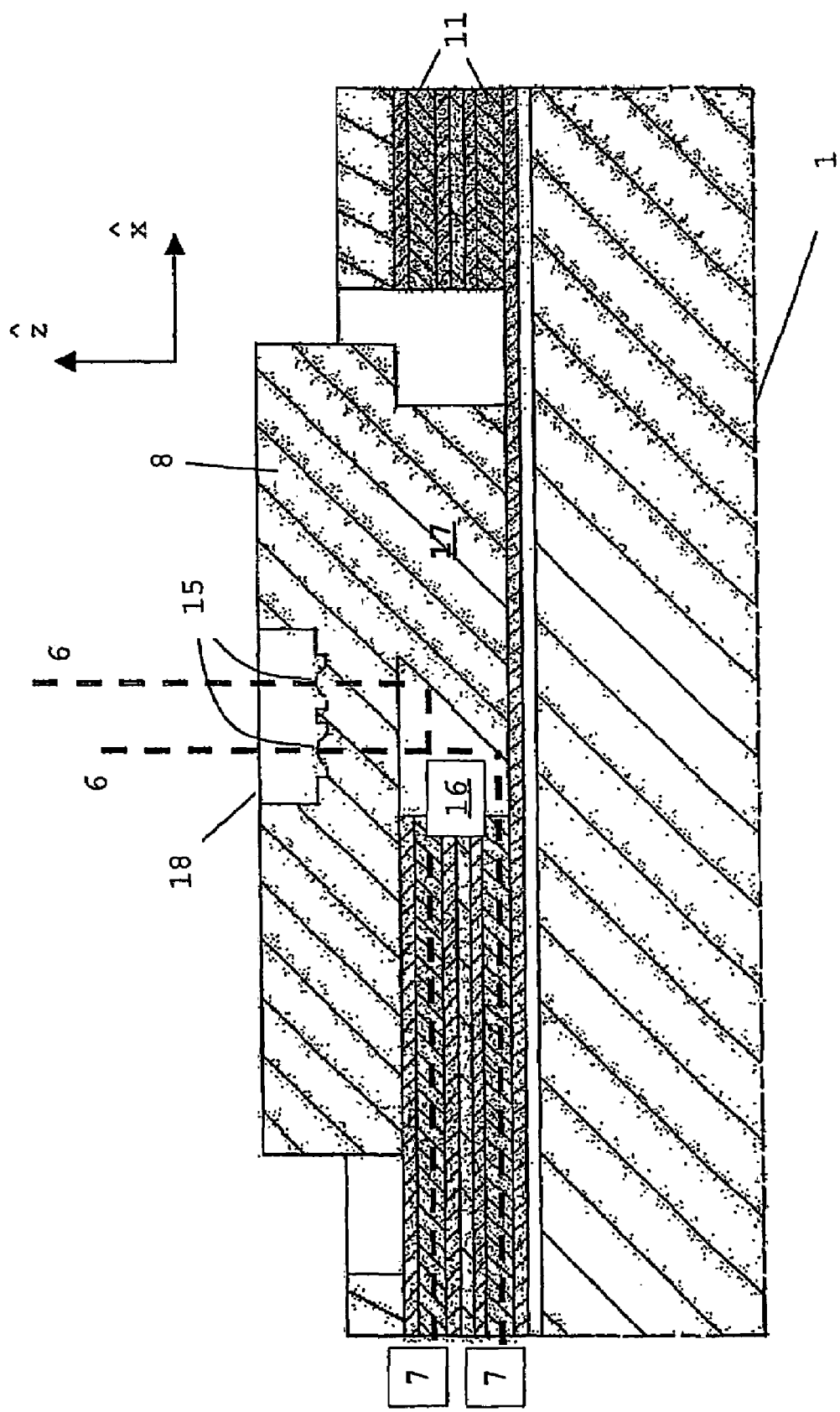

In FIG. 8B deflection of optical signals between two first optical paths 6 and corresponding second optical paths 7 is achieved by positioning a mirror mount 17 integrated with the coupling device 8 in the optical paths 6 and 7. The rest of the connector assembly is, mutatis mutandis, similar to the embodiment shown in FIGS. 4A-D and the corresponding description. Alignment of the coupling device 8 to the waveguides 2 or waveguide structures 3 as to optically couple the first optical paths 6 and the corresponding second optical paths 7 in both the x- and y-direction of the x-y plane is performed similar to the alignment process describes with reference to FIG. 3A-C. Z-axis control means, such as the space 23 under the mirror mount 17, the support structures 24 and the adhesive substance 25, are not shown here. However, it will be appreciated that these measured can be applied here as well.

Figure 8C:
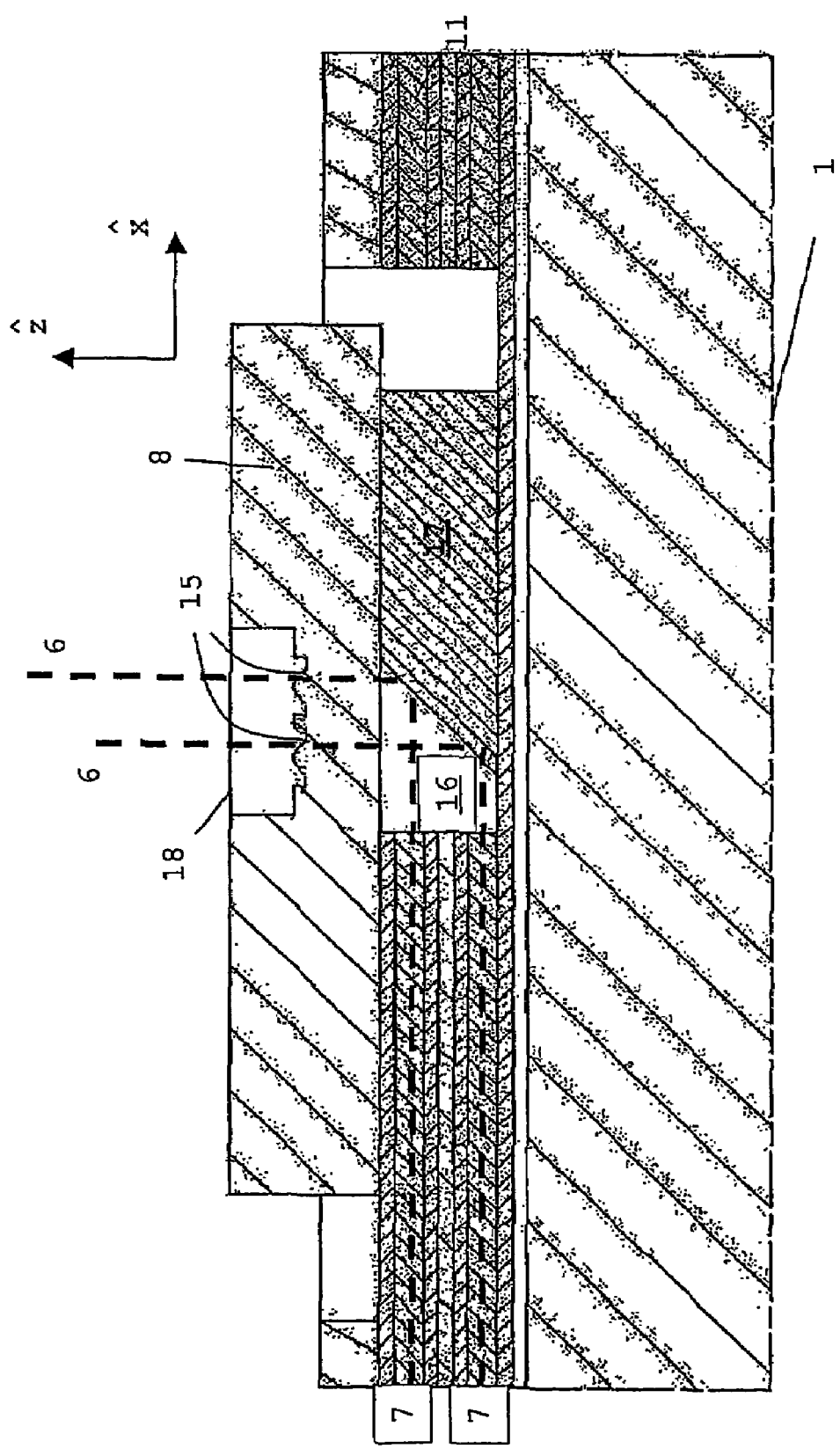

In FIG. 8C a separate mirror mount 17 is applied as to deflect optical signal between the two second optical paths 7 and the corresponding first optical paths 6. The rest of the connector assembly is, mutatis mutandis, similar to the embodiment shown in FIGS. 5A-C and the corresponding description. Alignment of the coupling device 8 to the waveguides 2 or waveguide structures 3 as to optically couple the first optical paths 6 and the corresponding second optical paths 7 in both the x- and y-direction of the x-y plane is performed similar to the alignment process describes with reference to FIG. 3A-C. Z-axis control means, such as the space 23 under the mirror mount 17, the support structures 24 and the adhesive substance 25, are not shown here. However, it will be appreciated that these measured can be applied here as well.

Figure 8D:
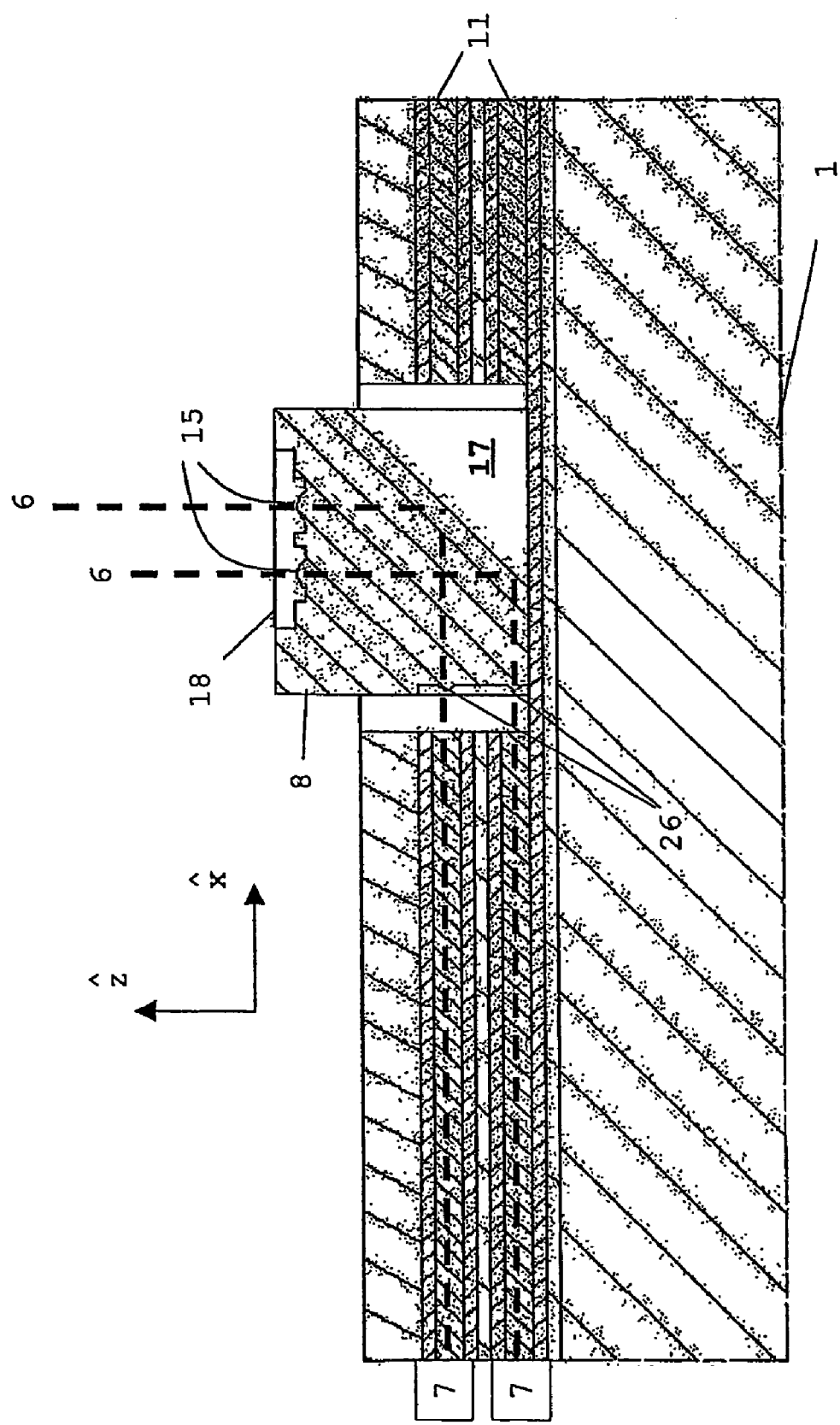

In FIG. 8D an alternative coupling device 8 is depicted, wherein the coupling device 8 integrates an internal mirror 17. Coupling device 8 further provides additional optical means 26, such as a lens or lens array in the second optical paths 7 of the waveguide structures 3.

For the purpose of teaching the invention, preferred embodiments of the optical connector assembly, the coupling device and the method for aligning have been described above. It will be apparent for the person skilled in the art that other alternative and equivalent embodiments of the invention can be conceived and reduced to practice without departing from the true spirit of the invention, the scope of the invention being only limited by the claims.

The invention claimed is:

1. Optical connector assembly comprising a layer stack having at least one waveguide structure in at least one x-y plane of said layer stack, and a coupling device providing at least one first optical path, said waveguide structure comprising at least one optical waveguide providing at least one second optical path deflecting from said first optical path, said coupling device comprising first reference means adapted to co-operate with second reference means in said layer stack, said second reference means being adapted for aligning said coupling device to said waveguide or waveguide structure in both the x- and y-direction of said x-y plane as to optically couple said first optical path and said second optical path, wherein said coupling device further includes an area comprising an optical component for providing said first optical path.

2. Optical connector assembly according to claim 1, wherein said coupling device comprises third reference means for aligning a mating optical device, providing a third optical path, with said waveguide or waveguide structure as to optically couple said second optical path and said third optical path.

3. Optical connector assembly according to claim 2, wherein said mating optical device comprises an optical connector having fourth reference means adapted to co-operate with said third reference means of said coupling device.

4. Optical connector assembly according to claim 2, wherein said third reference means and said fourth reference means are guide reference means.

5. Optical connector assembly according to claim 1, wherein said optical component is a lens or lens array.

6. Optical connector assembly according to claim 1, wherein said first optical path is deflected under a deflection angle from said second optical path by a reflective layer applied on a facet of at least said waveguide or a mirror mount positioned in said second optical path.

7. Optical connector assembly according to claim 6, wherein said reflective layer(s) or said mirror mount are adapted to deflect optical signals between multiple first optical paths provided said coupling device and multiple corresponding second optical paths provided by multiple waveguides or waveguide structures.

8. Optical connector assembly according to claim 6, wherein said mirror mount comprises reference means to position said mirror mount in said second optical path.

9. Optical connector assembly according to claim 6, wherein said mirror mount comprises further reference means to align said mirror mount and said optical component, comprising corresponding reference means, as to optically couple said first optical path to said second optical path.

10. Optical connector assembly according to claim 6, wherein at least one layer of said layer stack is adapted to position said mirror mount in said second optical path.

11. Optical connector assembly according to claim 10, wherein said layer stack exhibits a space under said mirror mount for fixing said mirror mount.

12. Optical connector assembly according to claim 10, wherein said mirror mount is supported by a cladding layer of the waveguide or waveguide structure.

13. Optical connector assembly according to claim 10, wherein said mirror mount is supported by support structures.

14. Optical connector assembly according to claim 6, wherein said coupling device comprises said mirror mount.

15. Optical connector assembly according to claim 6, wherein said mirror mount and said optical component are integrated in said coupling device.

16. Optical connector assembly according to claim 1, wherein said first reference means and second reference means have restricted dimensions in said x-y plane.

17. Optical connector assembly according to claim 1, wherein said first reference means and said second reference means are guide reference means or index reference means.

18. Optical connector assembly according to claim 1, wherein said second reference means are provided in one layer of said layer stack.

19. Optical connector assembly according to claim 1, wherein said second reference means are located in the layer stack while said second reference means remain available for aligning.

20. Optical connector assembly according to claim 19, wherein said second reference means are located in the layer stack corresponding to a layer of the waveguide or waveguide structure.

21. Optical connector assembly according to claim 20, wherein said second reference means are located on top of the layer stack.

22. Optical connector assembly according to claim 1, wherein said layer stack is a printed circuit board or backplane.

23. Coupling device for use in a optical connector assembly according to claim 1.

24. Coupling device according to claim 23, wherein said first reference means are guide reference means, said guide reference means defining a plane that is substantially parallel to said x-y plane.

25. Method for aligning a coupling device, providing at least one first optical path, to at least one waveguide structure, comprising at least one optical waveguide, in at least one x-y plane of a layer stack, said at least one waveguide providing at least one second optical path, deflecting from said first optical path, said coupling device comprising first reference means, said method comprising the steps of applying second reference means in at least one layer of said layer stack in a predetermined x-direction and y-direction relative to said waveguide structure;

aligning said coupling device and said waveguide structure by matching said first reference means in the x- and y-direction of said x-y plane with said second reference means, wherein said coupling device includes an area comprising an optical component providing at least a portion of said first optical path which is aligned over a deflection point in said layered stack between said second optical path and said first optical path.

26. Method according to claim 25, wherein said second reference means are applied in a layer of said layer stack corresponding to a layer of the waveguide or waveguide structure and/or on top of said layer stack.

27. Method according to claim 25, wherein third reference means are applied on said coupling device for aligning a mating optical device, providing a third optical path, with said waveguide or waveguide structure as to optically couple said second optical path and said third optical path.

28. Method according to claim 27, wherein said first reference means and said third reference means are applied in predetermined positions relative to each other.

29. Method according to claim 27, wherein said first reference means and second reference means are guide reference means or index reference means.

30. Method according to claim 25, wherein a reflective layer is applied on a facet of said waveguide or a mirror mount is provided in said second optical path.

31. Method according to claim 30, wherein at least one layer of said layer stack is adapted to support said mirror mount or said coupling device in said second optical path.

32. Method according to claim 31, wherein said mirror mount is supported by support structures provided in a space, said space at least substantially extending underneath said mirror mount.

33. Method according to claim 30, wherein said mirror mount is fixed in said layer stack by providing an adhesive substance in at least a part of said space underneath said mirror mount.

34. Method according to claim 33, wherein said adhesive substance exerts a pulling force on said mirror mount to accurately position said mirror mount in said second optical path.

* * * * *